United States Patent [19]

Miller et al.

[11] Patent Number: 4,947,970
[45] Date of Patent: Aug. 14, 1990

[54] DUAL CLUTCH CONTROL SYSTEM

[75] Inventors: Alan L. Miller, Chicago, Ill.; Susan W. Schultz, Boxford, Mass.; William P. Umlauf, Schererville, Ind.

[73] Assignee: Borg-Warner Automotive, Inc., Troy, Mich.

[21] Appl. No.: 268,786

[22] Filed: Nov. 8, 1988

[51] Int. Cl.$^5$ .................. F16D 43/284; B60K 41/02
[52] U.S. Cl. .................. 192/0.076; 192/0.032; 74/866
[58] Field of Search .............. 192/0.076, 0.096, 0.032, 192/0.034, 0.092; 74/866, 877

[56] References Cited

U.S. PATENT DOCUMENTS

| | | | |
|---|---|---|---|
| 4,570,511 | 2/1986 | Nishimura et al. | 74/877 |
| 4,730,712 | 3/1988 | Ohkumo | 192/0.076 |
| 4,732,246 | 3/1988 | Tateno et al. | 192/0.076 |
| 4,805,751 | 2/1989 | Ohkumo et al. | 192/0.096 |

FOREIGN PATENT DOCUMENTS

| | | | |
|---|---|---|---|
| 0135878 | 6/1989 | Fed. Rep. of Germany | 192/0.034 |
| 0121343 | 7/1983 | Japan | 192/0.032 |

*Primary Examiner*—Rodney H. Bonck
*Assistant Examiner*—Andrea Pitts
*Attorney, Agent, or Firm*—Neuman, Williams, Anderson & Olson

[57] ABSTRACT

A control system for a vehicle drive train includes a controller which is responsive to a throttle signal from a throttle position sensor and which controls a clutch unit to control speed and acceleration and to obtain optimum driver "feel". The system is responsive to advancing movement of a throttle to a more open position to efficiently utilize rotating energy of engine parts for more rapid vehicle acceleration.

20 Claims, 18 Drawing Sheets

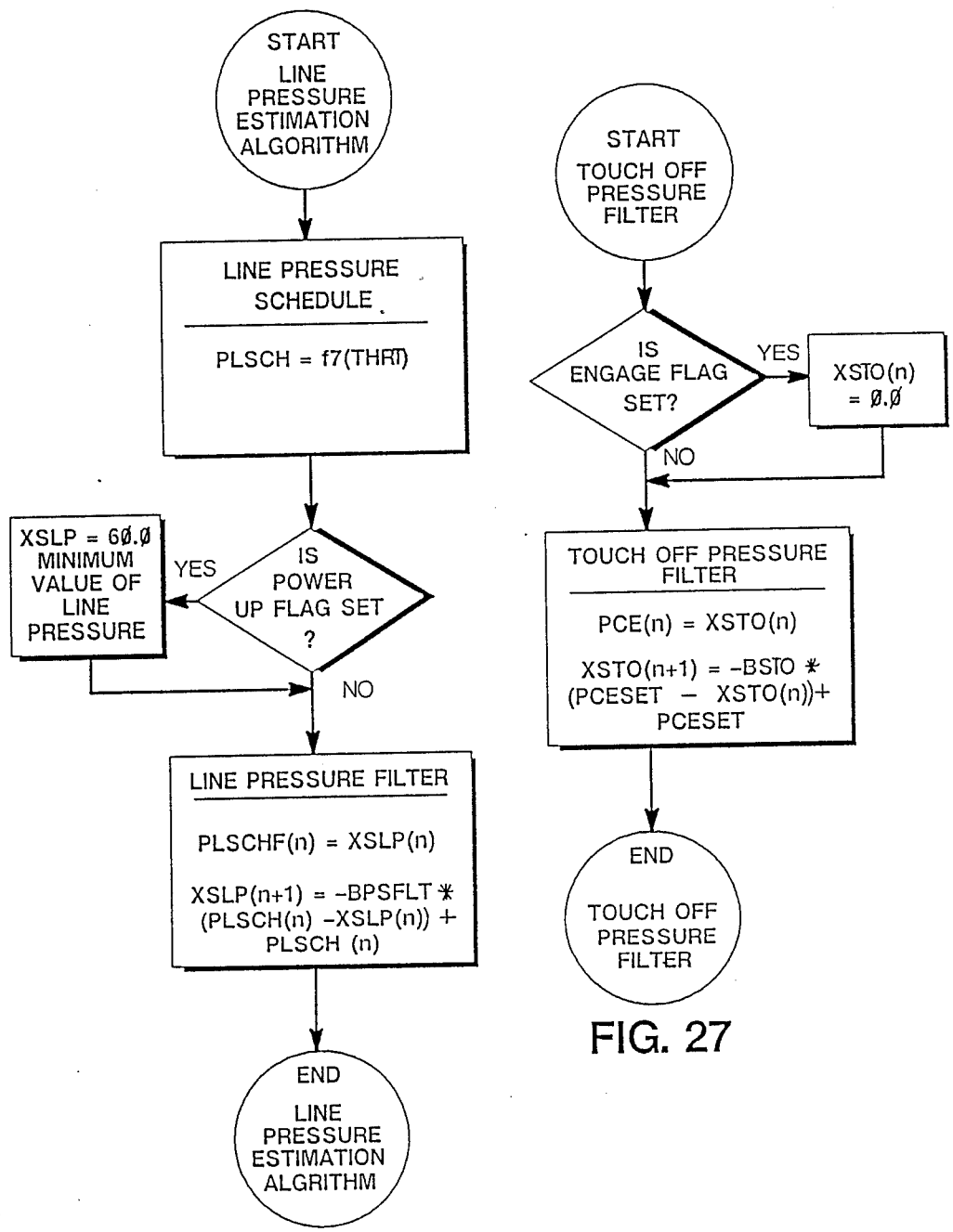

DUAL CLUTCH CONTROL SYSTEM

BACKGROUND OF THE INVENTION

1. Field of the Invention

This invention relates to a dual clutch control system and more particularly to a system for obtaining improved torque-transmission characteristics in an engine drive train under throttle control. The system is operative to provide improved acceleration characteristics by efficiently using the kinetic energy of rotating engine parts and provides accurate and reliable control in response to throttle changes, obtaining optimum "driver feel". The system makes efficient and reliable use of control parameters which are determined by static and dynamic characteristics of drive train components and is versatile and readily adaptable to take into consideration the characteristics of engines, clutches, transmissions and other components as well as wheel slip.

2. Background of the Prior Art

In a prior-filed copending application entitled "DUAL CLUTCH APPLICATION AREA AND CONTROL", Ser. No. 107,143, filed Oct. 9, 1987, an improved system is disclosed which is particularly advantageous for use with a high torque engine, such as a gas turbine engine, to provide an interface between the engine and the transmission in an automobile or other vehicle. As disclosed in that application, a clutch is provided having a relatively small apply area and a separate relatively large apply area to actuate the pressure plate to effect clutch engagement. Separate hydraulic systems are provided for controlling the application of hydraulic fluid pressure to the two areas. The system for the small apply area is a closed loop system with a fast response while the system for the large area is relatively slow in response. Pulse-width modulated signals may be applied to solenoid valves of the two hydraulic systems to control the pressures applied to the small apply and large apply piston areas.

Other prior art relates to clutches for continuously variable transmissions and includes applications of Petzold, et al. entitled "CONTINUOUSLY VARIABLE TRANSMISSION CLUTCH CONTROL SYSTEM", U.S. Ser. No. 025,391, filed Mar. 13, 1987, Petzold, et al. entitled "SPECIAL START TECHNIQUE FOR CONTINUOUSLY VARIABLE TRANSMISSION CLUTCH CONTROL", U.S. Ser No. 025476, filed Mar. 13, 1987, and U.S. Pat. No. 4,648,496, issued Mar. 10, 1987 to Petzold and Miller.

SUMMARY OF THE INVENTION

This invention was evolved with the general object of providing a system which achieves improved torque-transmission characteristics while being efficient and highly reliable in operation and achieving optimum "driver feel".

It is also an object of the invention to provide a system which is versatile and readily adaptable for use with components having different static and dynamic characteristics and under a variety of operating conditions.

An additional object of the invention is to provide a system which is readily and economically manufacturable.

In a system constructed in accordance with the invention, a dual clutch arrangement such as disclosed in the aforesaid prior application is used for transmitting torque from a gas turbine engine to a transmission in the drive train of an automobile or other vehicle, the engine being controlled by a conventional foot throttle. It will be understood that the various features of the invention are not necessarily limited to use with a dual clutch such as disclosed in the aforesaid prior application and it is not necessarily limited to use with a gas turbine engine.

An important feature of the invention relates to the control of a clutch in a manner such as to take advantage of the rotating inertia torque of an engine, i.e. the kinetic energy of rotating parts, to obtain improved acceleration characteristics under high throttle conditions. In a preferred embodiment, an engine speed setpoint is used in the control of clutch operation and it is decreased as a function of throttle position so that the larger the throttle, the more the control system will use the rotating inertia torque to accelerate the vehicle.

Additional features relate to the provision of schedules and filters which take into account the static and dynamic characteristics of components and the relationship thereof to throttle operation and timing, to obtain highly stable and reliable operation while also obtaining optimum "feel", efficiency and other advantages.

A system constructed in accordance with the invention is arranged for developing and combining signals in a logical and straight-forward manner such as to achieve optimum control and operating characteristics, avoid instabilities and permit adjustment in accordance with operating characteristics and in accordance with the static and dynamic characteristics of components of the system. An illustrated system includes a closed loop control of the pressure applied to a small piston area and an open loop control of pressure applied to a large piston area. In developing signals for control of the two pressures, an initial feed-forward torque determination is made to determine actual turbine engine torque as a function of throttle position, this torque signal being delivered to a torque-apply strategy section which develops pressure setpoint signals for application to inner and outer piston pressure loops. Through the feed-forward torque determination section and the torque-apply strategy section, a total pressure is applied which is designed to produce a net torque of zero and to thereby neither accelerate nor decelerate the engine.

A speed loop is provided for applying an engine speed signal as a feedback signal to the inner piston pressure loop and it operates to dynamically adjust the inner piston pressure setpoint as determined by the torque-apply strategy section to obtain an actual engine speed which is equal to the engine speed setpoint. The speed signal is determined as a function of throttle position and it is used in a manner such as to achieve the use of rotating inertia torque for rapid acceleration when required.

The feed-forward and engine speed setpoints are developed through use of the filters which may preferably be first-order digital filters and which are operated with time constants which are such as to achieve optimum driver's "feel" of clutch engagement as well as to achieve optimum vehicle acceleration. Additional filters are used to achieve optimum control, in a stable and reliable manner, such filters lead/lag and integral-lead filters in the inner and outer piston pressure loops.

The invention contemplates other objects, features and advantages which will become more fully apparent from the following detailed description taken in conjunction with the accompanying drawings.

BRIEF DESCRIPTION OF THE DRAWINGS

FIGS. 20-28 are flow charts illustrating an implementation of the controller of FIG. 2 with the sections as illustrated in the diagrams of FIGS. 3, 8, 12, 15, 18 and 19.

DESCRIPTION OF A PREFERRED EMBODIMENT

Figure 1:
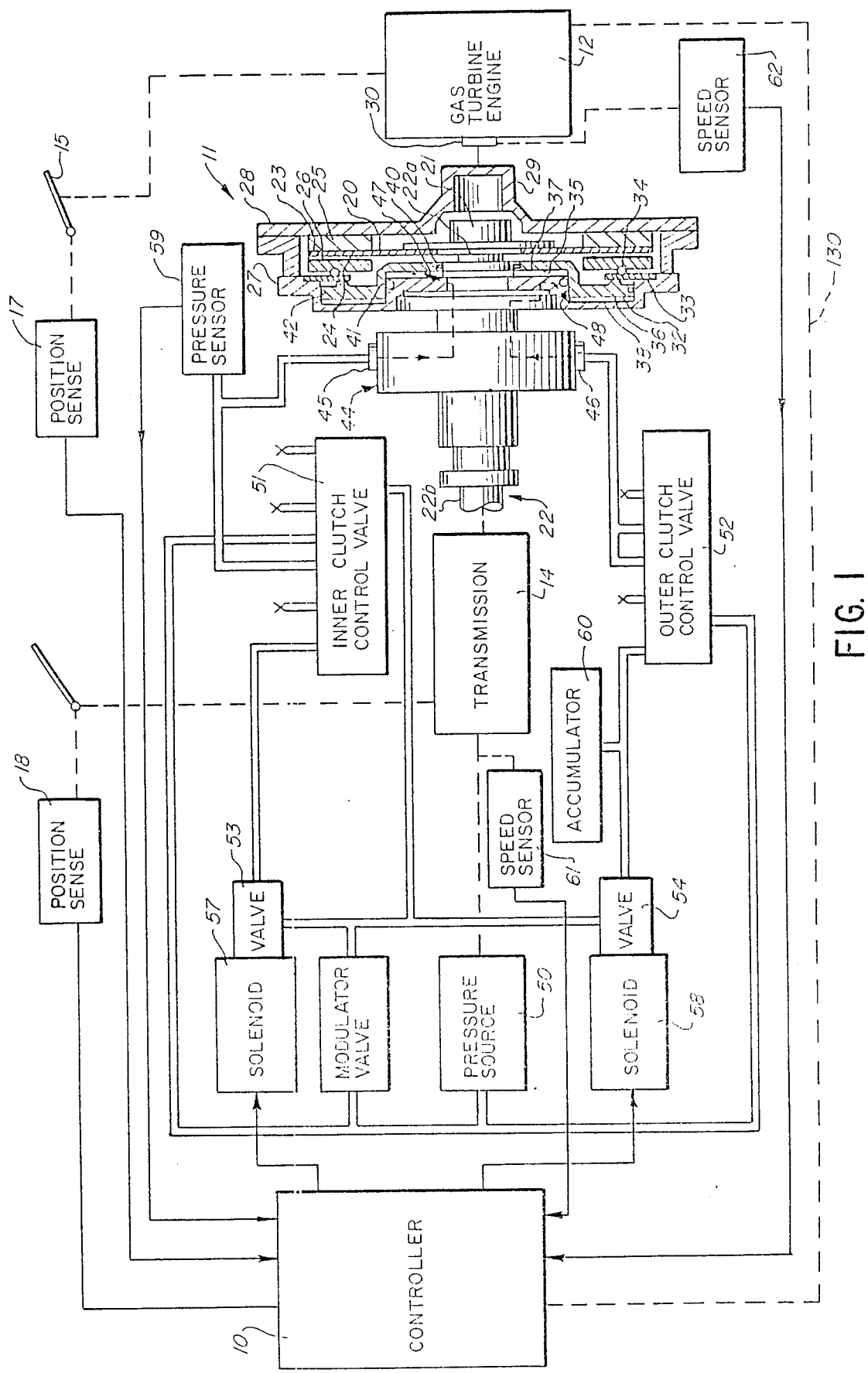
FIG. 1 is a schematic diagram of a dual clutch control system which is constructed in accordance with the invention.

FIG. 1 illustrates a system which is constructed in accordance with the principles of the invention and which includes a controller 10 for control of a start clutch unit 11 which operates to apply torque between an engine 12 and a transmission 14 which is arranged for coupling to vehicle drive wheels, not shown. A throttle 15 and a shift lever 16 control the engine 12 and transmission 14 through control means, not shown, and are connected to position sensors 17 and 18 which apply control signals to the controller 10.

The engine 12 as indicated is a gas turbine engine and may, for example, be a General Motors AGT-5 gas turbine engine while the transmission 14 may be a multi-speed automatic transmission. The start clutch unit 11 of the illustrated system is a wet friction clutch unit operative to respond to two separately applied control pressures which may preferably be derived from a hydraulic pump of the transmission 14. Through the controller 10, the control pressures are accurately and reliably controlled to obtain smooth accelerations and the best driver "feel" over a full range of throttle positions. When a fast start is desired, acceleration is increased by taking advantage of the kinetic energy of rotating parts of the engine during idle conditions.

Another important advantage of the system is that it is readily adaptable to obtain optimum operation with engines, transmissions, clutches and other components of various different types and characteristics. In the disclosure of a preferred embodiment in the drawings and in the following description, the values of operating parameters and ranges of variables may be specifically related to the characteristics of particular clutch units, engines, transmissions or other components, but it will be understood that they are provided only as illustrative examples and that the various important features of the system of the invention are usable with components of other types and having other characteristics.

The clutch unit 11 preferably has a construction such as disclosed in detail in the aforementioned prior-filed copending application, U.S. Ser. No. 107,143, the disclosure of which is incorporated by reference. As shown somewhat diagrammatically, it includes a clutch plate 20 which is supported on a central hub 21 splined to one end 22a of a shaft 22 having an opposite end 22b is connected to the transmission 14 to form an input shaft thereof. The clutch plate 21 has peripheral friction faces 23 and 24 sandwiched between and engageable with a reaction plate 25 and a pressure plate 26, plates 25 and 26 being carried within an assembly formed by a cover 27 and a cover plate 28, the cover plate being secured to a central hub 29 splined or otherwise connected to an output shaft 30 of the engine 12.

To engage the clutch 11, an actuating piston 32 is provided for moving the pressure plate 26 toward the reaction plate 25 to effect frictional engagement with the friction faces 23 and 24 and to effect the transmission of torque from the assembly of the cover 27 and cover plate 28 to the clutch plate 20 and shaft 22. In the construction as shown, the piston 32 has an annular fulcrum rib portion 32a which engages an inner edge portion of one face of a Belleville spring 33 which has an outer edge portion secured within the cover and cover plate assembly 21. A pressure ring 34 is disposed between an opposite face of the Belleville spring and the pressure plate 26.

To respond to separately applied control pressures, the actuating piston 32 has inner and outer concentric annular portions 35 and 36, the inner annular portion 35 having a smaller area than the outer annular portion 36 thereof. The cover 27 is formed to cooperate with such small and large area piston portions 35 and 36 to provide inner and outer variable volume chambers 37 and 38. Seal rings 40, 41 and 42 are provided as shown and are in slidable engagement with cylindrical surface portions of the cover 27. A rotary seal assembly 44 is provided for defining flow passages from stationary inlet ports 45 and 46, through paths within assembly as indicated by dotted lines and through ports 47 and 48 in the cover 27 to the inner and outer chambers 37 and 38, for application of fluid pressure to the small and large area piston portions 35 and 36. The rotary seal assembly 44 may also define passages for flow of fluid to a sump, not shown, connections to the sump being indicated by reference character "X" in the drawing.

To controllably apply fluid under pressure to the inner small area piston portion 35 and the outer large area piston portion 36, the inlet ports 45 and 46 are coupled to a fluid pressure source 50 through inner clutch and outer clutch control valves 51 and 52. Source 50 may preferably be the aforementioned hydraulic pump of the transmission 14 which supplies a relatively low pressure, it being a feature of the system of the invention that a high operating pressure is not required.

The valves 51 and 52 are preferably spool valves and are controlled through pilot valves 53 and 54 which are connected through a modulator valve 56 to the fluid pressure source 50. Pilot valves 53 and 54 are controlled, in turn, by solenoids 57 and 58 connected to the controller 10. The controller 10 supplies pulse width modulated signals to the solenoids 57 and 58 to control the pilot valves 57 and 58 and thereby control the inner and outer clutch control valves 51 and 52 and thereby control the pressures applied to the inner and outer small and large area piston portions 35 and 36.

As shown, a closed loop feedback control is provided for control of the pressure applied to the small area piston portion 35, a pressure sensor 59 being connected to the inlet port 45 and being connected electrically to the controller 10 to supply a control signal PCLU which is proportional to the pressure applied to the small area piston portion 35.

When the required torque is within a low range, less than a certain value, pressure need be applied only to the small area piston portion 35. For higher ranges of torques, a pressure may be applied to the large area piston portion 36, to augment the pressure which is applied to the small piston portion 35. With this feature, a quite large torque may be transmitted through the clutch unit 11 in response to a relatively low control pressure. The pressure applied to the small area piston portion 35 may be varied as rapidly as necessary and it is not necessary that the pressure applied to the large area piston portion 36 be rapidly changed so that undesirable torque variations are obviated. In the illustrated system, an open loop control is used for the large area piston portion 36. An accumulator 60 may be connected to the line between the solenoid controlled pilot valve 54 and the outer clutch control valve 52 to stabilize the control of the valve 52 and inhibit rapid variations in the pressure applied to the outer large area piston portion 36.

The two piston area configuration was chosen over a single area to reduce the clutch gain for closed loop control. The clutch gain is the physical property which relates the clutch torque to the clutch pressure. In this application of the control, the supply or line pressure is relatively low. Therefore, a high clutch gain is required in order to achieve the desired torque capacity. Since the clutch gain is relatively high, a closed loop control of the system would have a tendency to be unstable for any appreciable controller gain required to minimize steady state error. Using the two piston area configuration, the inner piston clutch gain is approximately 30% of the total clutch gain, while the outer piston pressure area is the remaining 70% of the total clutch gain. This enables closed loop control of the inner piston pressure by electronic means using a pressure transducer to measure inner piston pressure. The outer piston pressure is controlled open loop, however, the configuration of the outer piston area pressure control valve does offer hydraulic pressure feedback.

The system of FIG. 1 further includes a transmission speed sensor 61 which is mechanically coupled to the output shaft of the transmission 14 and an engine speed sensor 62 which is mechanically coupled to the output shaft 30 of the engine 12, the sensors 61 and 62 being operative to supply electrical signals to the controller 10 which are functions of the speed of rotation of the output shaft of transmission 14 and the speed of rotation of the output shaft 30 of the engine 12.

CONTROL SYSTEM OVERVIEW

Figure 2:
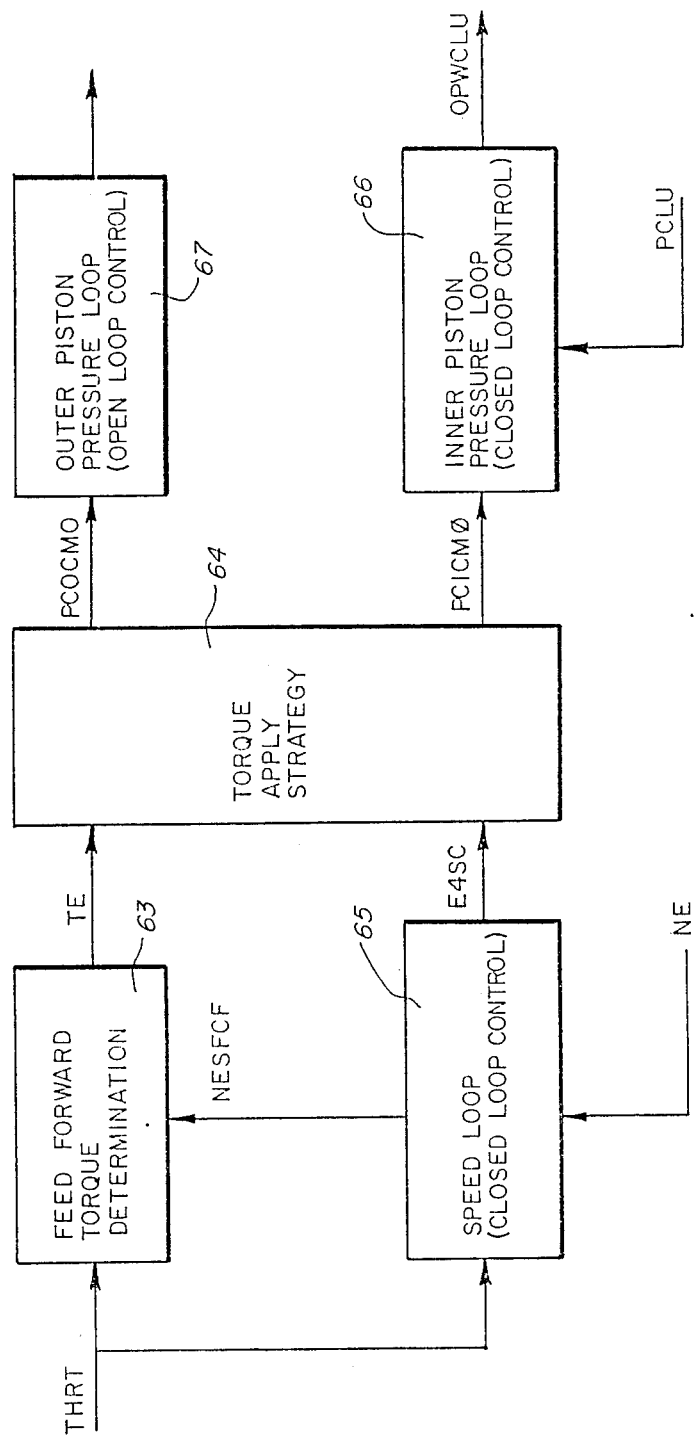
FIG. 2 is a block diagram illustrating sections of a controller of the system of FIG. 1 and the cooperation thereof.

The system of control of the clutch unit 11, obtained through the controller 10, can be divided into six separate portions or sections, five of which are depicted in the block diagram of FIG. 2 and shown in more detail in FIGS. 3, 8, 12, 15 and 18, plus an additional control section of FIG. 19, these sections being as follows:

1. Feed forward torque section 63 (FIG. 3)
2. Torque apply strategy section 64 (FIG. 8)
3. Speed loop section 65 (FIG. 12)
4. Inner piston pressure loop section 66 (FIG. 15)
5. Outer piston pressure loop 67 section (FIG. 18)
6. Mode control section 68 (FIG. 19)

Figure 3:
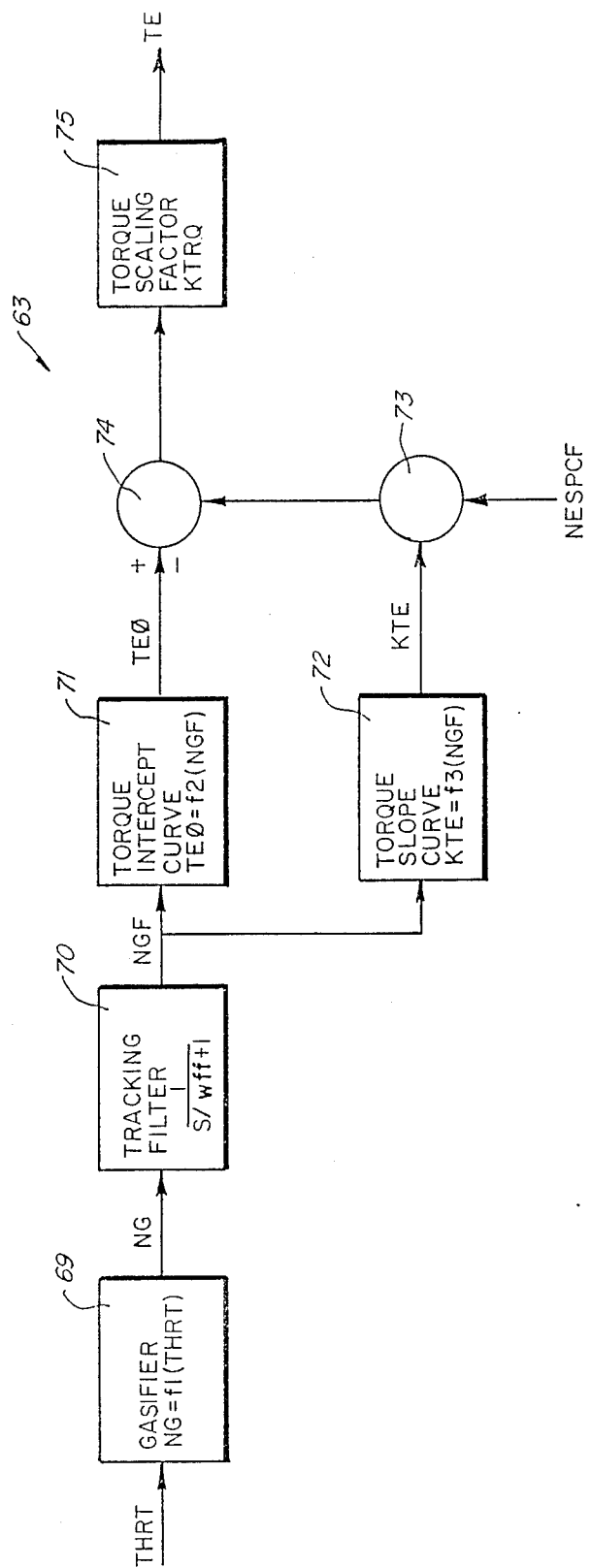
FIG. 3 is a schematic block diagram illustrating a feed-forward torque configuration section of the controller of FIG. 2.

In the illustrated system, these control sections are performed digitally using programmed operations as set forth in the flow charts of FIGS. 20–28, but they may be performed by other equivalent electronic or other means. In brief, the function of the feed forward torque determination section 63, shown in detail in FIG. 3, is to yield a torque signal representative of the actual turbine engine torque as a function of throttle position. The torque signal developed by the feed forward torque determination section is then delivered to the torque apply strategy.

Figure 8:
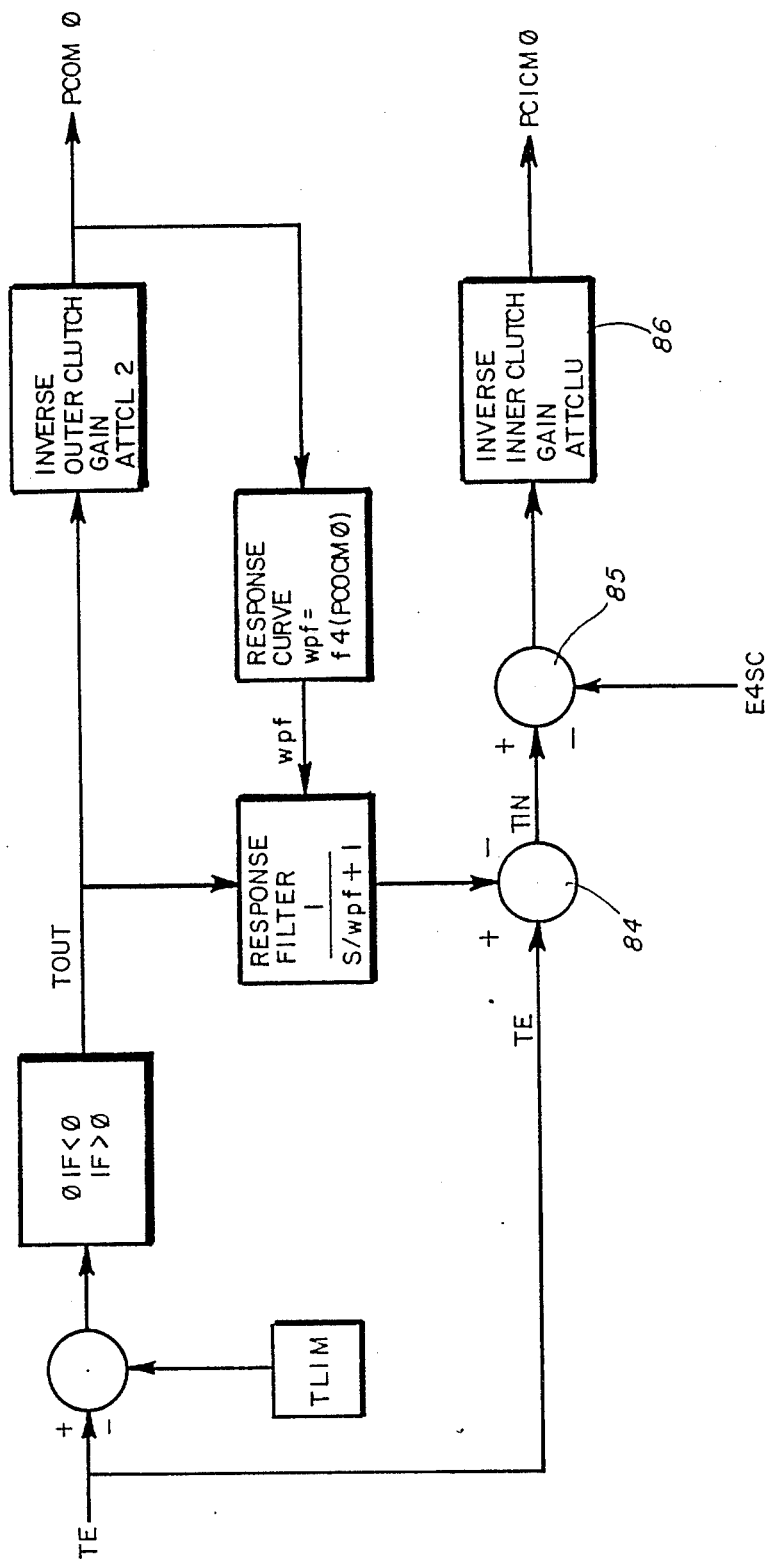
FIG. 8 is a schematic block diagram of a torque-apply strategy section of the controller of FIG. 2.

The torque apply strategy section 64, shown in detail in FIG. 8, distributes the amount of the feed forward torque as pressure setpoints to the inner and outer piston pressure loop sections which operate to control feed forward components of pressures which are applied to the inner and outer piston portions 35 and 36. These feed forward pressures place a load torque on the engine designed to match the actual engine torque and should ideally provide a net torque of zero which should not accelerate or decelerate the engine.

Figure 12:
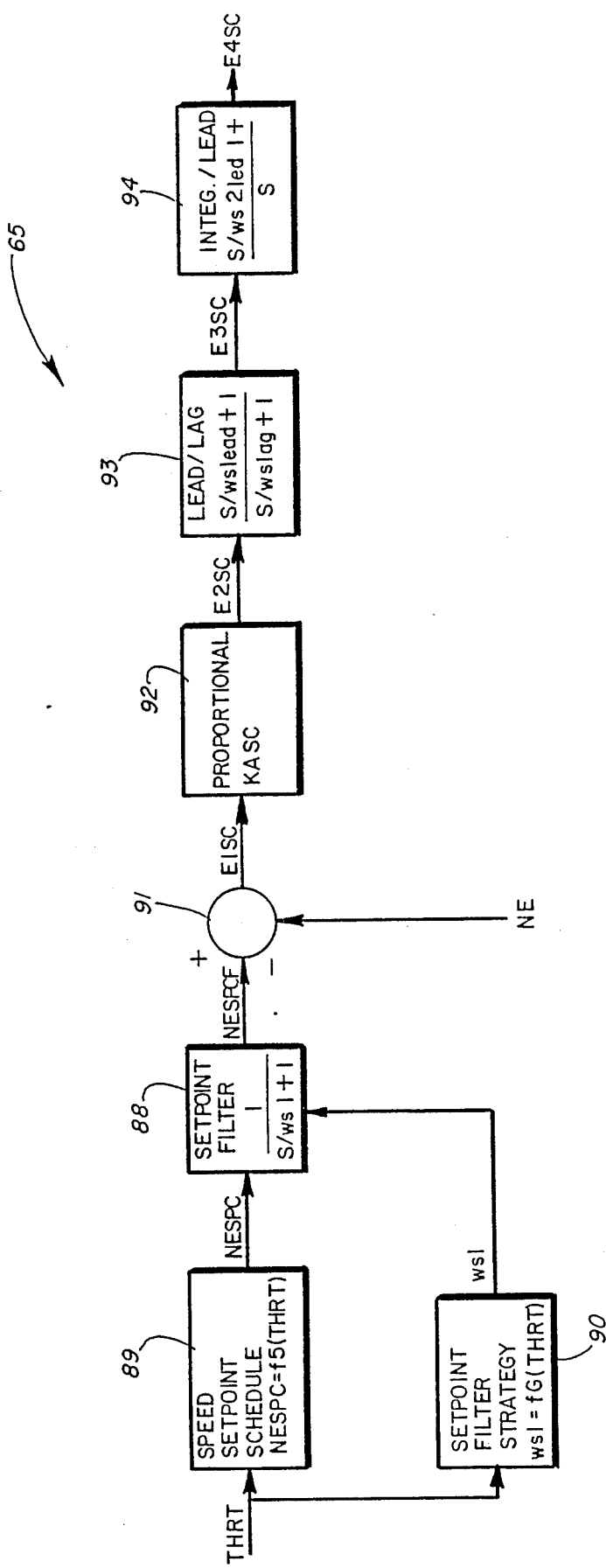
FIG. 12 is a schematic block diagram of a speed loop section of the controller of FIG. 2.

The speed loop section 65, shown in detail in FIG. 12, is a closed loop control operation which employs the engine speed signal as a feedback signal. It operates to dynamically adjust the inner piston pressure setpoint as determined by the torque apply strategy, to obtain an actual engine speed equal to an engine speed setpoint. It can be thought of as correcting for differences between the actual engine torque and the predicted engine torque. The engine speed setpoint is determined as a function of a signal applied from the throttle position sensor 16 which corresponds to the position of the throttle 18.

First order digital filters are included in sections 63 and 65 to determine feed forward and engine speed setpoints with proper filter initialization. The filter time constant on the feed forward torque signal is chosen to match the response of the actual engine torque. To customize the driver's "feel" of the clutch engagement and vehicle acceleration through the start mode, the filter time constant on the engine speed setpoint is chosen to be a function of throttle position.

Figure 15:
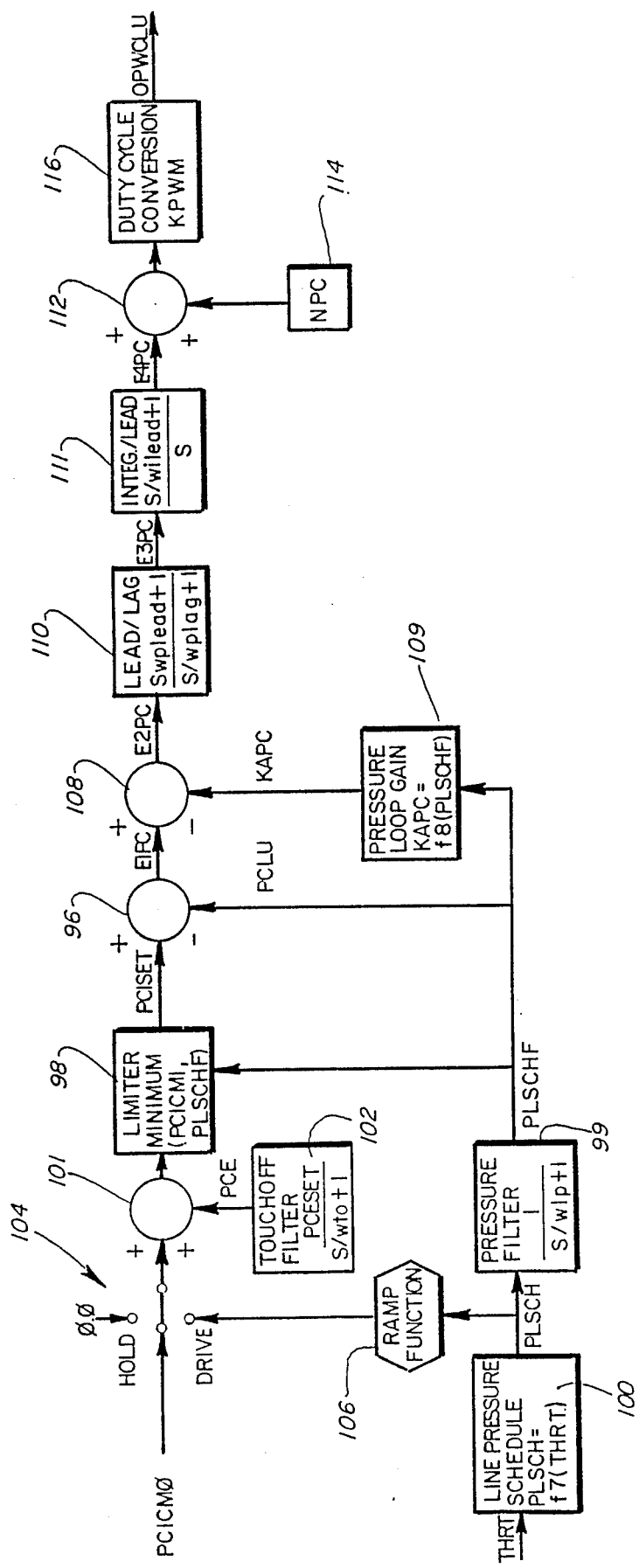
FIG. 15 is a schematic block diagram of an inner pressure loop section of the controller of FIG. 2.

The function of the inner pressure loop section 66, shown in detail in FIG. 15, is to control the inner clutch pressure to the setpoint determined by the torque apply strategy, speed loop, and clutch touch-off pressure setpoints. The touch-off pressure is the maximum pressure required to bring the clutch plates together without carrying torque. It is a closed loop control employing inner clutch pressure as the feedback. The output of this control is a duty cycle used to modulate the PWM signal to the solenoid valve.

Figure 18:
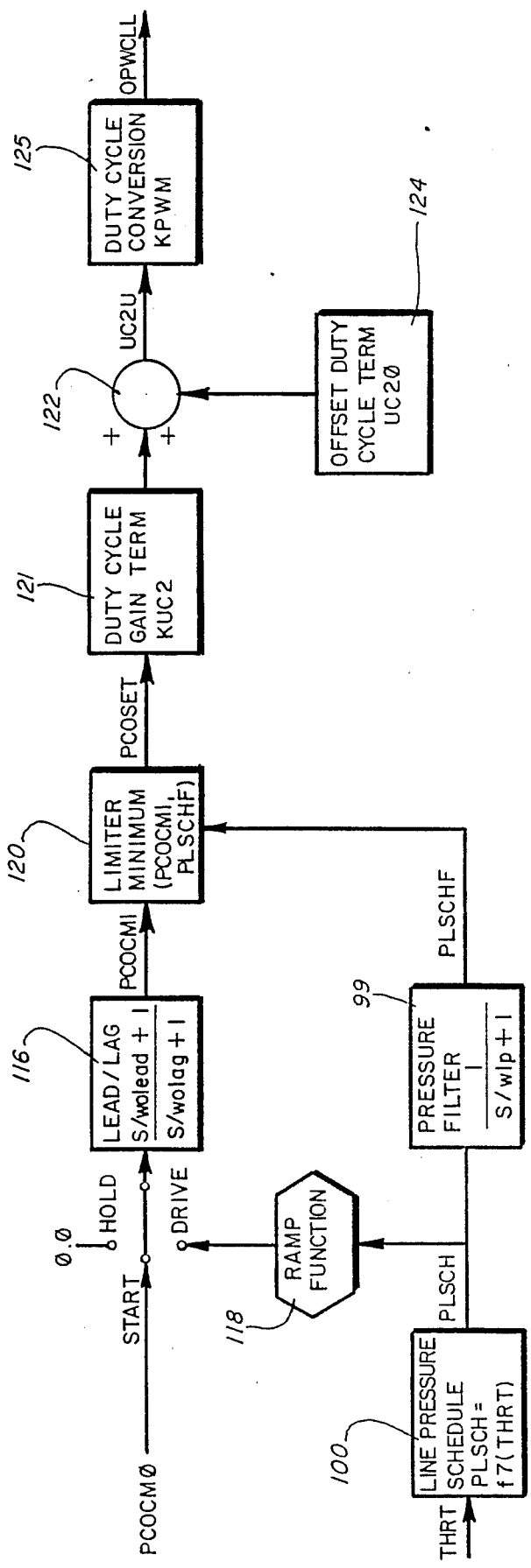
FIG. 18 is a schematic block diagram of an outer pressure loop of the controller of FIG. 2.

The outer piston loop 67, shown in detail in FIG. 18, is an open loop control of the outer piston pressure to the setpoint determined only by the torque apply strategy. The outer clutch is applied at the higher operating torques of the engine. The output of this control is also a duty cycle used to modulate the PWM signal to the solenoid valve.

Figure 19:
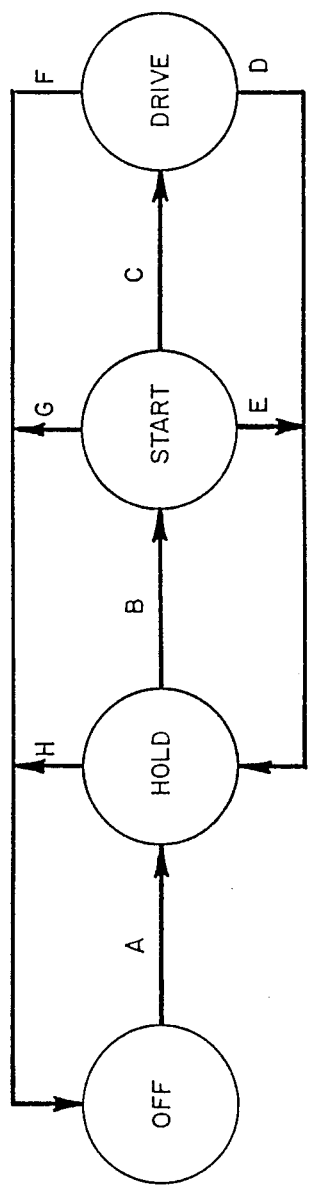
FIG. 19 is a schematic diagram of a mode control section.
Figure 20:
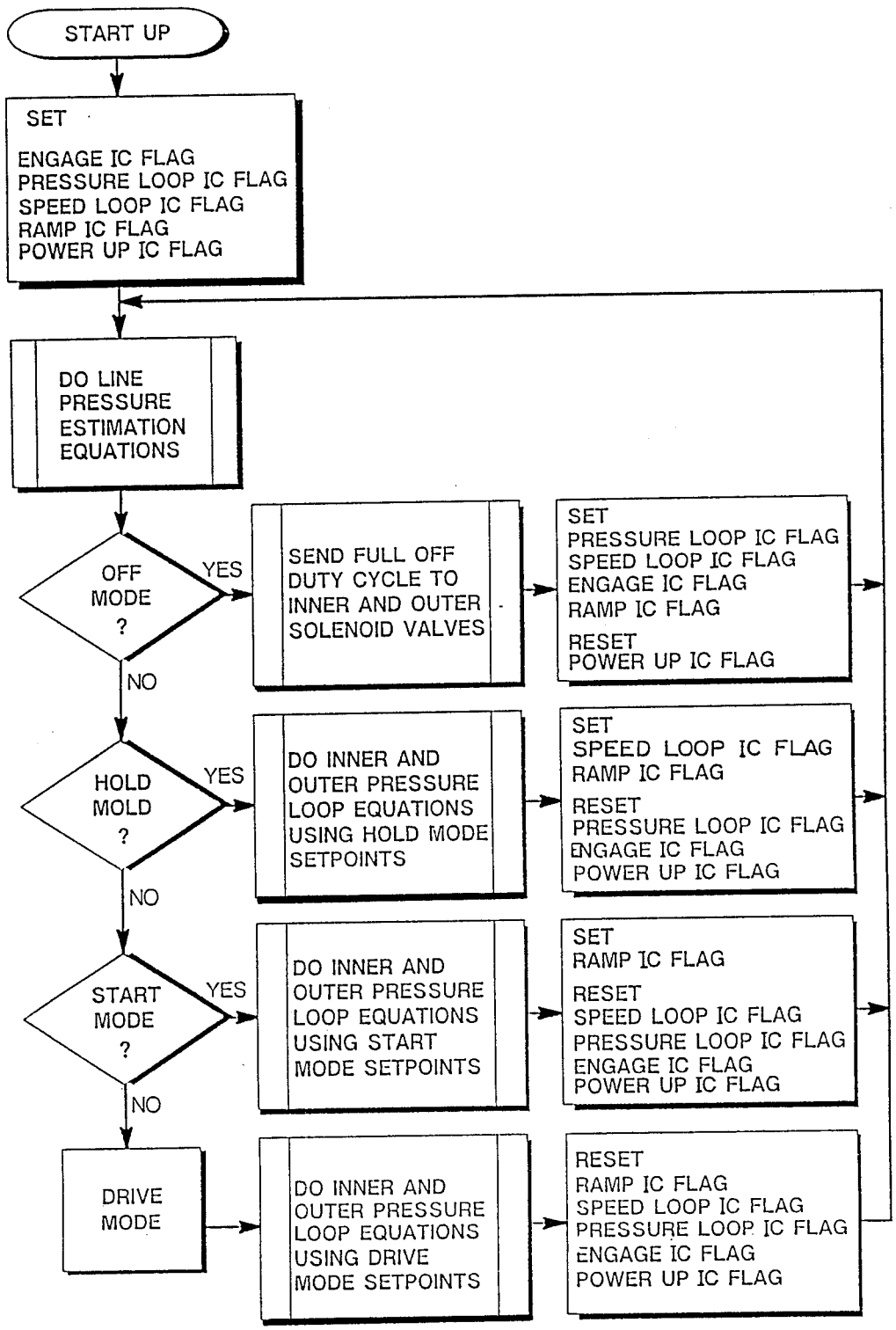
Figure 21:
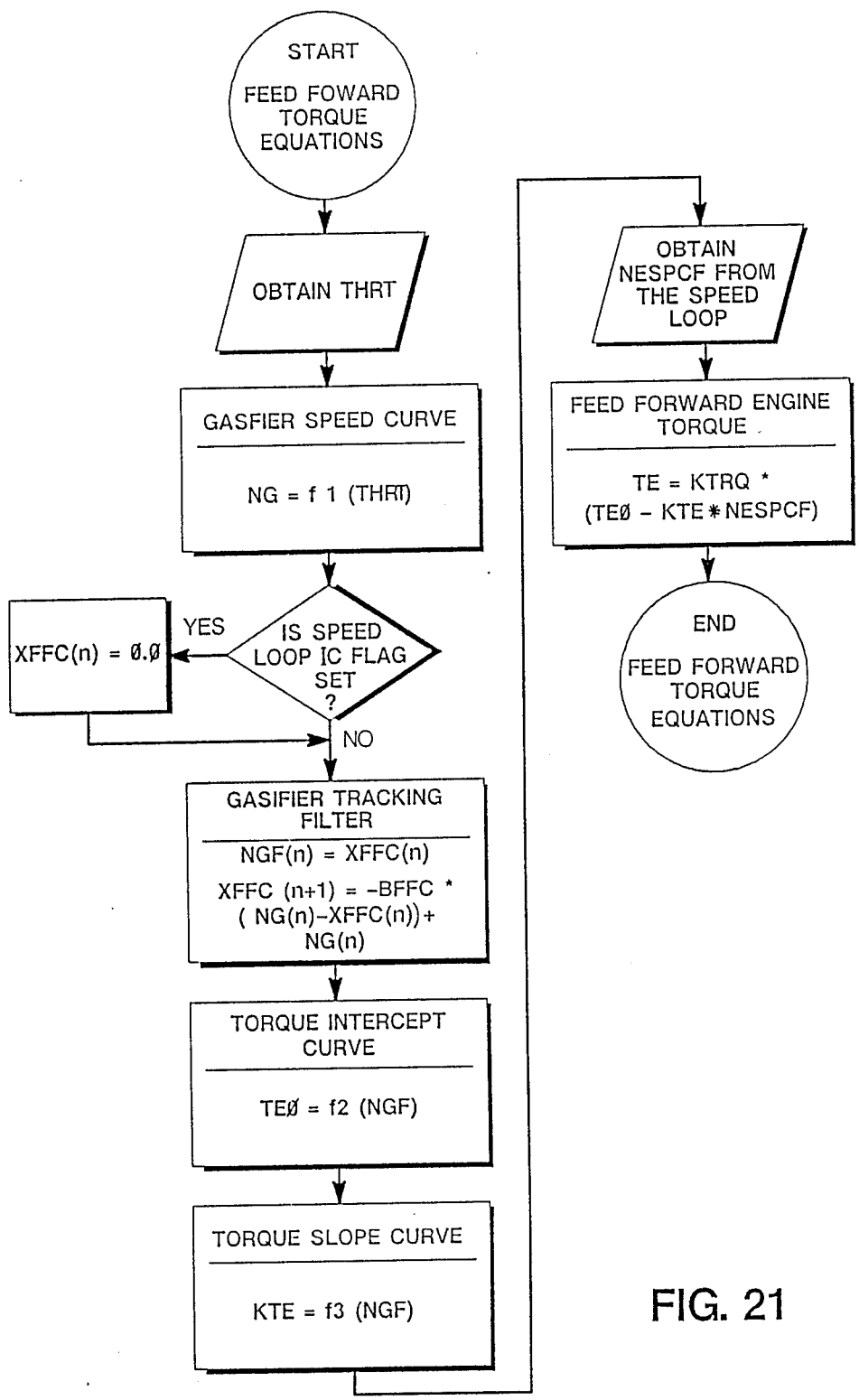
Figure 22:
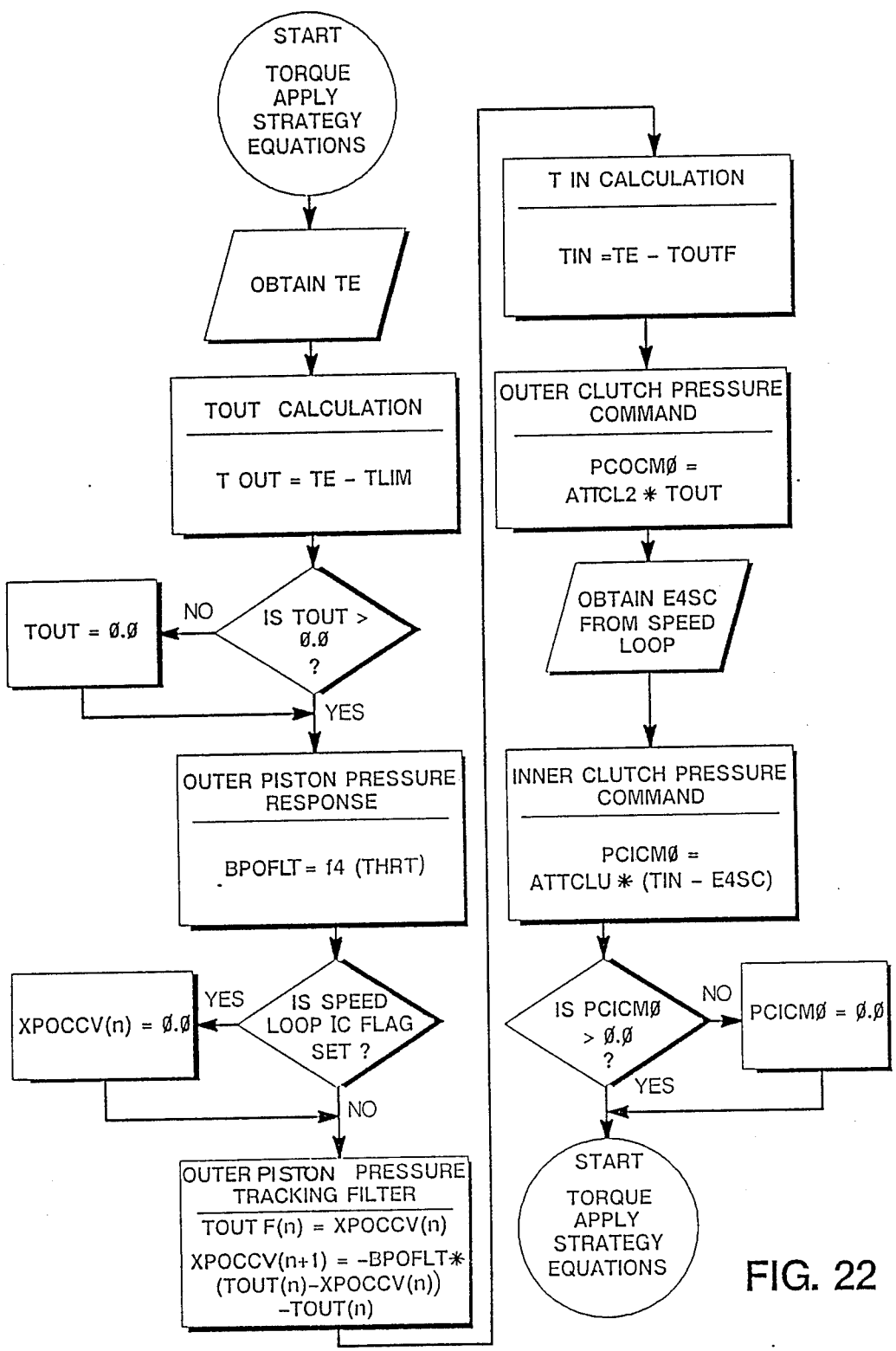
Figure 23:
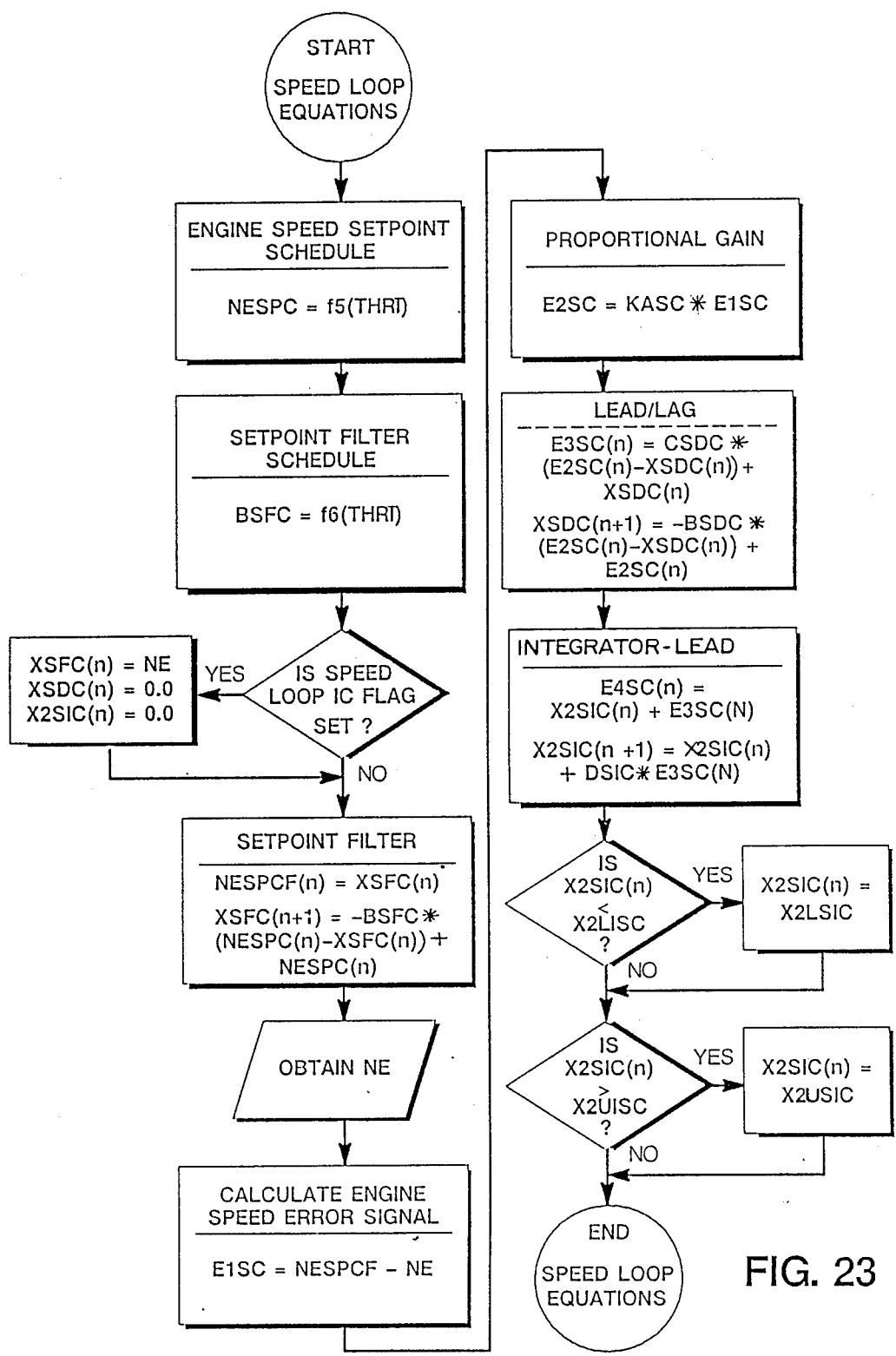
Figure 24:
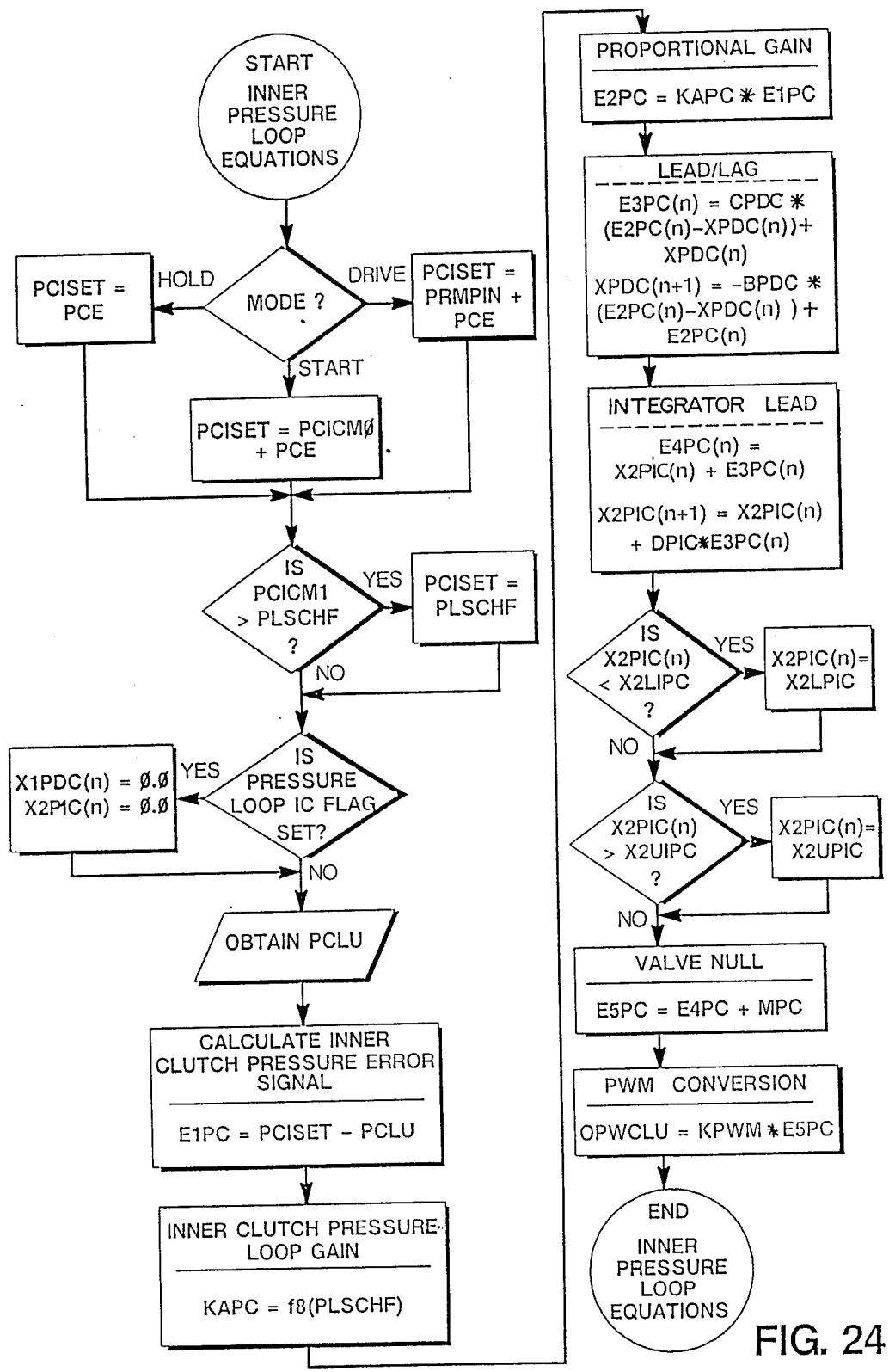
Figure 25:
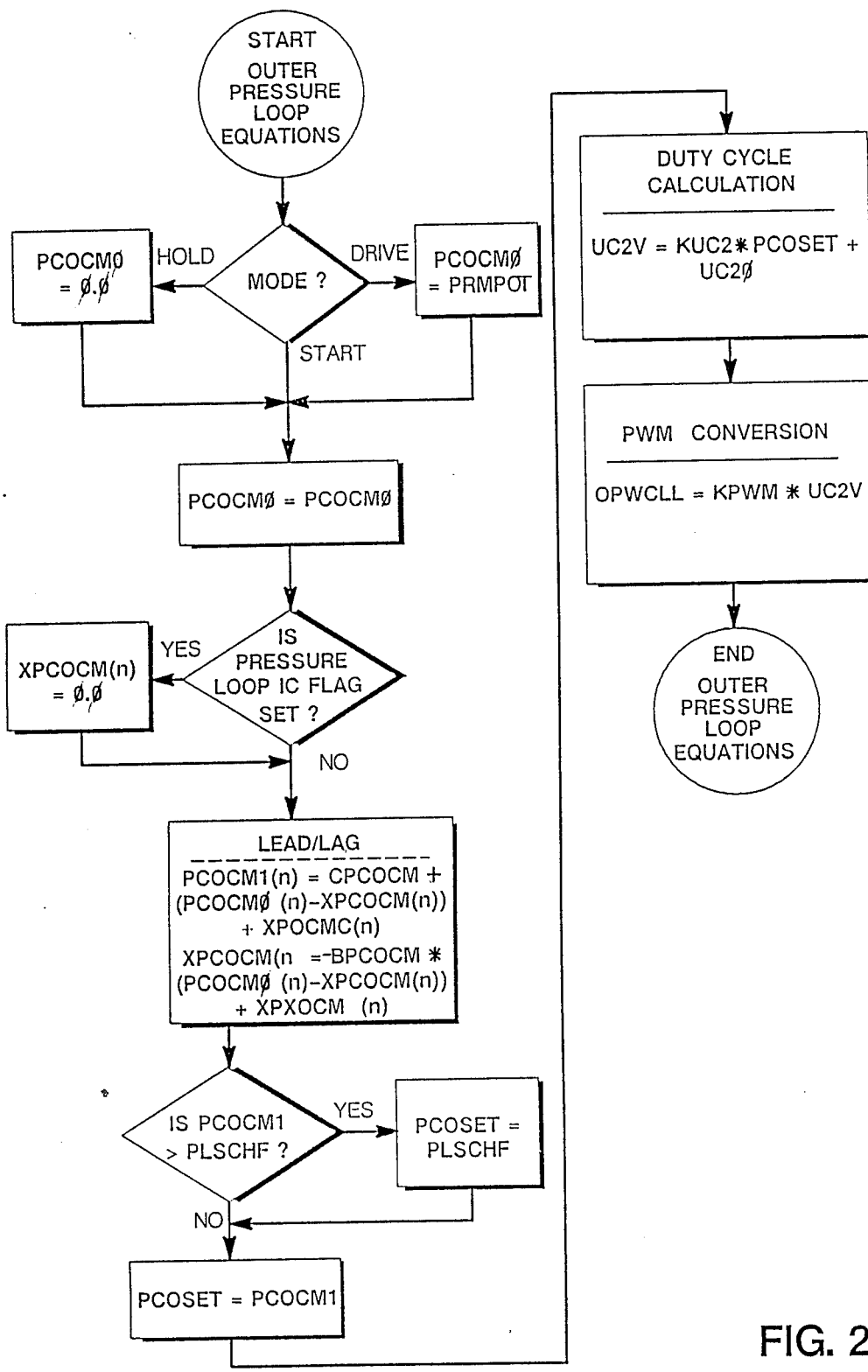
Figure 28:
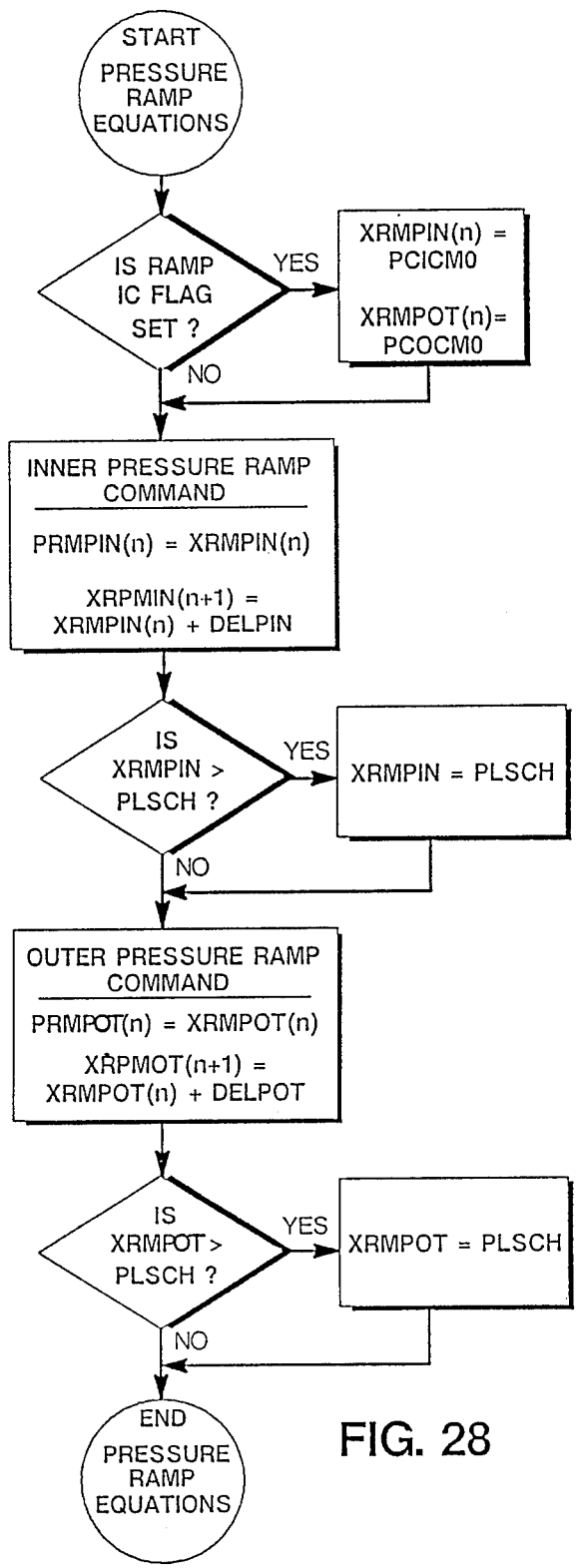

The mode control section 68 of the system, shown in FIG. 19, contains the system logic. Logic is required to run the controllers properly such as initialization of filters and determination of setpoints. The inputs to the logic are engine speed, driveline speed, throttle position, and shift lever position.

Tables 1 through 13 are hereinafter set forth, listing various parameters and operating variables which are used in the system. Units and values for such parameters and variables are set forth in such tables for the purpose of providing an illustrative example. It should be understood that they are not to be construed as limitations and that the parameters and values may be changed in accordance with the characteristics of the components of a system and in accordance with particular operating characteristics which may be required or desired. The following sub-sections describe the algorithms which use such parameters and variable to implement the control functions of the system.

FEED FORWARD TORQUE DETERMINATION

The feed forward torque command signal produced by the section 63 of FIG. 3 has the variable name TE and is determined to be equal to the estimated engine torque, as a function of the throttle position variable THRT and a signal NESPCF which is taken from the speed loop section 65 of FIG. 12.

As aforementioned, the engine of the illustrated system is a gas turbine engine and the system is designed to accommodate and to take advantage of the characteristics of a gas turbine engine, but it should be understood that various features of the invention are applicable to other types of engines. The parameters of a turbine engine which define the engine torque are the gasifier speed and the actual engine speed. The turbine engine generates a steady-state torque that decreases linearly with engine output speed. Thus, the maximum torque output is delivered at low engine speeds. The low speed engine torque increases with increasing gasifier speed. The speed of rotation of the gasifier increases in response to throttle demand, reaching a steady-state value for a particular throttle setting in about one second. Thus, during the course of this rise in gasifier speed in response to throttle command, the engine torque increases with some delay.

Figure 4:
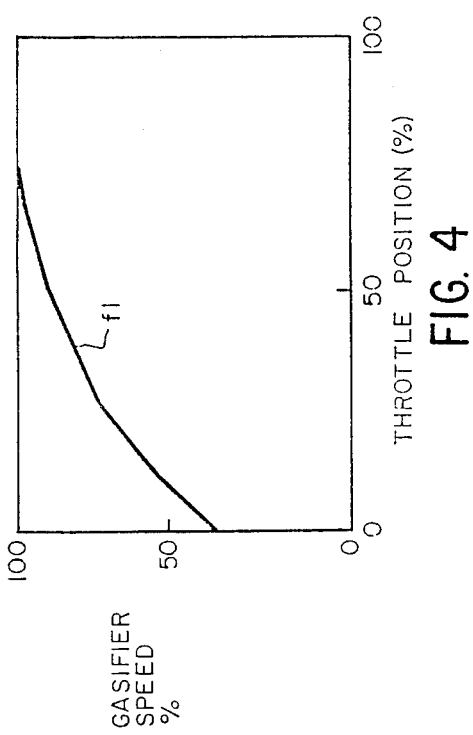
FIG. 4 is a graph illustrating the relationship of the speed of a gasifier of a turbine engine of the system to throttle position.

As indicated by block 69 in FIG. 3, the steady-state gasifier speed is tabulated as a function of throttle position:

$$NG = f1(THRT)$$

where:
  NG=estimated gasifier speed
  THRT=throttle position
  f1=gasifier speed curve
This functional relationship is shown in FIG. 4. This speed is then passed through a first order tracking filter 70 to estimate the actual gasifier speed. The equation for the filter 70 in the frequency domain is:

$$NGF = \frac{1}{s/wff + 1} NG$$

where s is the Laplace transform variable and wff is the cutoff frequency of the filter. The discrete form of the filter is:

$$NGF(n) = XFFC(n)$$

$$XFFC(n+1) = -BFFC*[NG(n) - XFFC(n)] + NG(n)$$

where:
  Tsf=sample period of feed forward
  $BFFC = exp(-wff * Tsf)$
  n=number of sample periods since control initiation
  NGF=filtered gasifier speed
  XFFC=filter state variable and where the initial condition is:

$$XFFC(0) = 39.0 \text{ (lowest gasifier speed)}$$

Figure 5:
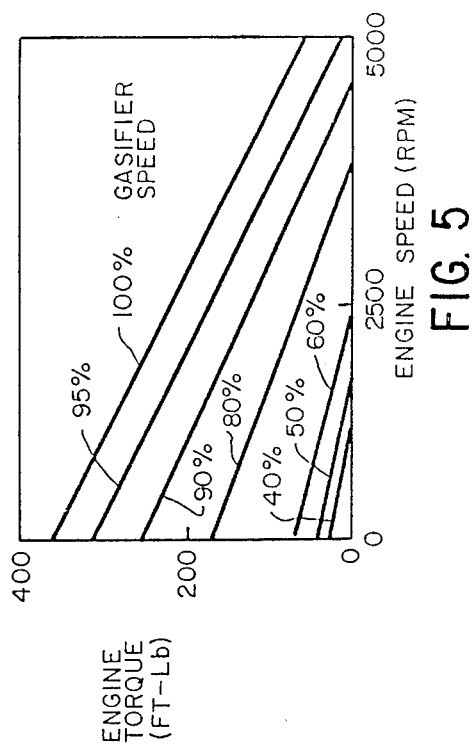
FIG. 5 a graph illustrating the steady state relationship of torque to speed of the turbine engine, at various gasifier speeds.
Figure 7:
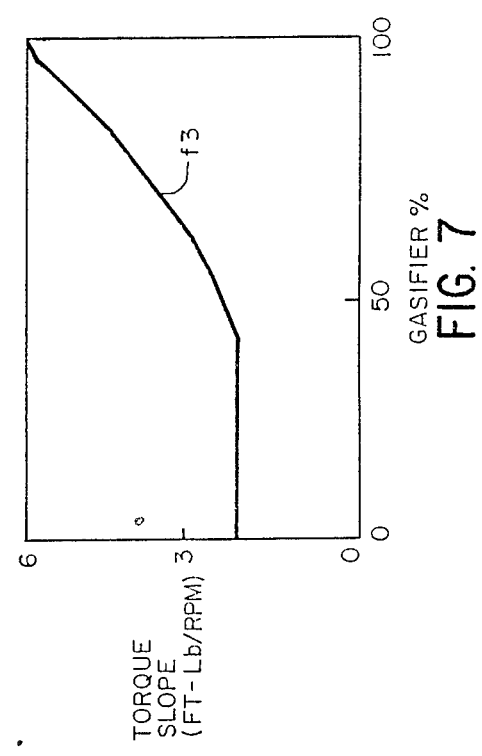
FIG. 7 is a graph illustrating the relationship of torque to gasifier speed.
Figure 6:
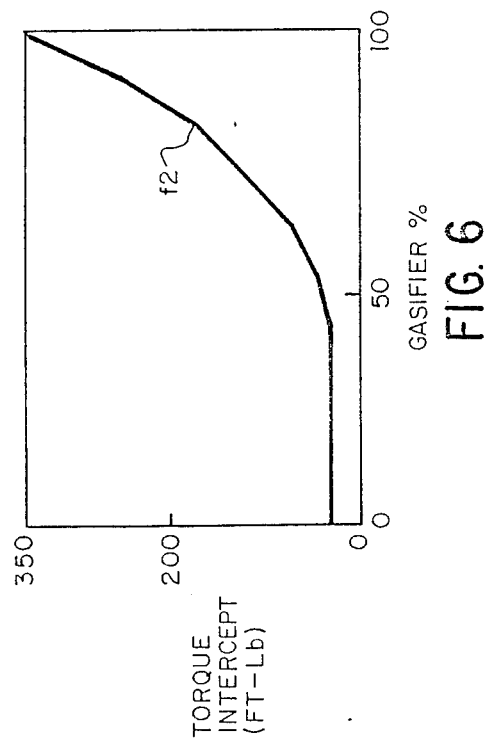
FIG. 6 is a graph illustrating the relationship of a torque intercept to gasifier speed.

After developing the filtered gasifier speed signal NGF, the engine torque is determined from tabulated functions of the filtered engine speed setpoint and estimated gasifier speed. These functions are determined from a steady state engine map shown in FIG. 5. In the illustrated engine map, torque is represented by straight lines as a function of engine speed for a given gasifier speed. As shown in FIG. 3, torque intercept curve and torque slope curves operations are performed as indicated by blocks 71 and 72, to determine the functions:

$$TEO = f2(NGF)$$

$$KTE = f3(NGF)$$

where:
  TEO=intercept (torque at zero speed)
  KTE=slope of line
  f2=intercept curve
  f3=slope curve
The graphs defining the intercept and slope functions are shown in FIGS. 6 and 7 respectively. The engine torque is then obtained using a multiplying operation 73, a summation operation 74 and a second multiplying or scaling operation 75 as depicted in FIG. 3, following the equation:

$$TE = KTRQ * (TEO - KTE*NESPCF)$$

where:
  TE=estimated value of engine torque
  NESPCF=filtered engine speed setpoint
  KTRQ=scaling factor used in testing
The filtered engine speed set-point signal NESPCF is used in favor of the actual engine speed so as not to close a loop around the engine speed in the feed forward torque command. The determination of the engine speed setpoint signal is described in the description of the speed loop section 65, shown in FIG. 12.

TORQUE APPLY STRATEGY

A block diagram of the torque apply strategy section is shown in FIG. 8. This section of the overall control scheme determines inner and outer piston pressure setpoints which determine the distribution of forces applied by the inner and outer piston portions 35 and 36 and which thereby determine the corresponding components of the torque transmitted by the clutch unit 11. It operates in response to the estimated torque signal TE developed by the feed forward torque determination section 65 of FIG. 3 and also in response to a speed loop adjustment signal E4SC from the speed loop section 65, shown in FIG. 12. An outer piston area torque command TOUT is developed through a summation operation 77, responsive to the estimated torque signal TE and to a limit speed limit signal TLIM applied from a block 78, a limiter 80 being responsive to the summation operation 77 to the develop the TOUT signal. The following equation applies:

$$TOUT = \begin{cases} TE - TLIM & \text{for } TE - TLIM > 0.0 \\ 0.0 & \text{for } TE - TLIM \leq 0.0 \end{cases}$$

where:
  TOUT = outer piston area torque command
  TLIM = maximum amount of feed forward which can be applied to the inner piston With this determination, the outer piston area torque command will be zero until the feed forward torque is greater than the value of TLIM. The method for determining TLIM is discussed hereinafter in connection with the speed loop section 65 of FIG. 12.

Prior to determination of an inner piston torque command TIN, the outer torque command TOUT is filtered through a first order filter 81 to develop a TOUTF signal. A cut-off frequency signal wpf is applied to filter 81 which is a function of an outer piston area pressure command PCOCMO, developed from the TOUT signal by multiplying by an outer piston area inverse gain parameter ATTCL2 in an operation 82. The command PCOCMO is applied to the filter 81 through a response curve operation 83 which develops the cut-off frequency signal wpf. After the filter 81 determines the filtered TOUT signal TOUTF, an inner piston torque command TIN is determined by a summation operation 84 responsive to the TOUTF and TE signals. Then an inner pressure setpoint PCICM0 is determined from a summation operation 85 which sums the TIN signal and a speed loop adjustment signal E4SC from the speed loop section 65 of FIG. 12, a signal developed by operation 85 being multiplied by an inner piston area inverse gain parameter ATTCLU through a multiplying operation 86 to develop the inner pressure setpoint PCICM0.

Figure 9:
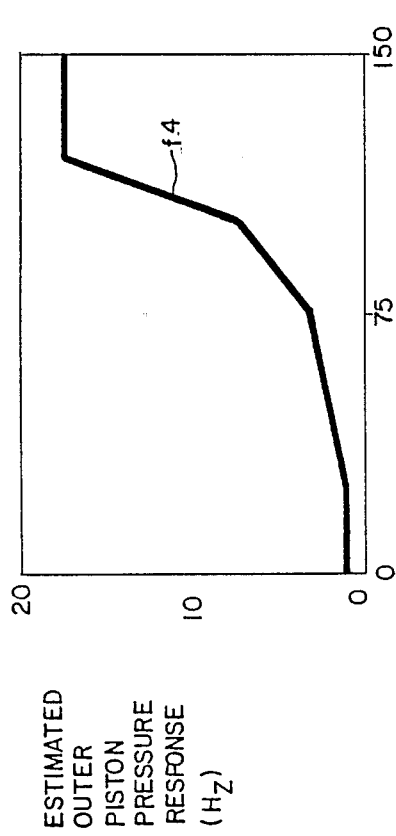
FIG. 9 is a graph illustrating the relationship of outer piston pressure response to outer piston pressure setpoint.

The function of filter 81 is shown in graphically in FIG. 9. This filter function is used to track the dynamic response of the outer piston pressure. The form of this filter in the frequency domain is:

$$TOUTF = \frac{1}{s/wpf + 1} TOUT$$

where wpf is the cutoff frequency of the filter. The discrete form of the filter is:

$$TOUTF(n) = XPOCCV(n)$$

$$XPOCCV(n+1) = -BPOFLT[TOUT(n) - XPOCCV(n)] + TOUT(n)$$

where:
  wpf = f4(PCOCMO)
  PCOCMD = outer piston area pressure command
  BPOFLT = $exp(-wpf * Tsf)$
  TOUTF = filtered outer piston area torque command
  XPOCCV = filter state variable
and where the initial condition:
  XPOCCV(0) = 0.0

After determining the filtered TOUT signal TOUTF, an inner piston torque command TIN is determined by the summation operation 84 responsive to the TOUTF and TE signals as set forth in the following equation:

$$TIN = TE - TOUTF$$

where:
  TIN = inner piston area torque command

By this method, if the filter 81 is considered to be at steady state, (TOUTF=TOUT), then: $-TIN = TE - TOUT$ but: $TOUT = \begin{cases} 0.0 \text{ for } TE - TLIM \leq 0.0 \\ TE - TLIM \text{ for } TE - TLIM > 0.0 \end{cases}$ therefore:

$$TIN = \begin{cases} TE \text{ for } TE \leq TLIM \\ TLIM \text{ for } TE > TLIM \end{cases}$$

Figure 10:
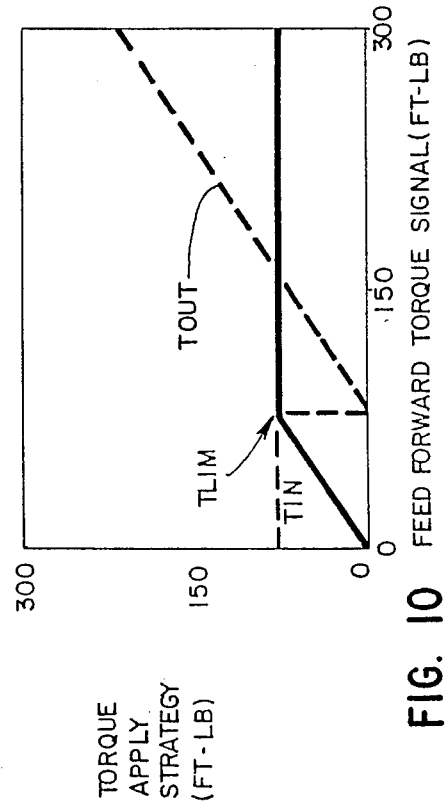
FIG. 10 is a graph illustrating the relationship of signals of a torque-apply strategy section to a feed-forward torque signal.

An examination of the above formulas shows that the inner piston torque command is limited to the value of TLIM. FIG. 10 shows this steady state relationship graphically.

Figure 11:
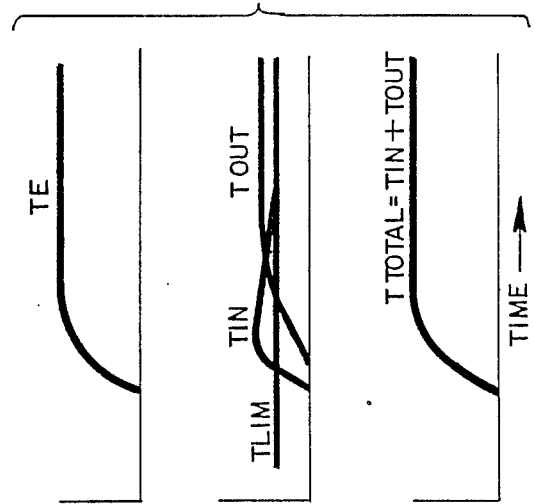
FIG. 11 is a graph illustrating an example of operation of a torque-apply strategy section shown in FIG. 8.

The purpose of the filter 81 on the output torque command signal is to initially allow TIN to be greater than TLIM to account for the delay in building up pressure in the outer piston. The outer piston pressure response is significantly slower then the inner piston pressure response, especially at the lower outer piston pressures. FIG. 11 provides a graphical example for illustrating the principle of operation of this feature. The upper portion of FIG. 11 shows an example of the variation of the estimated torque signal TE with time; the intermediate portion shows how the TOUT signal lags the TE signal and also how the TIN signal initially increases with the TE signal and then starts to drop toward the TLIM value; the lower portion shows how the sum of the TOUT and TIN signals, shown as a TOTAL curve, would approximate the TE signal.

The following equations apply to the operation of the output portions of the torque apply strategy section 64 of FIG. 8 and show how the speed loop adjustment signal E4SC is taken into account:

PCOCMO = ATTCL2*TOUT

PCICMO =

-continued $$\begin{cases} ATTCLU * (TIN - E4SC) & \text{for } TIN - E4SC > 0.0 \\ 0.0 & \text{for } TIN - E4SC \leq 0.0 \end{cases}$$

where:
PCOCM0 outer feed forward pressure command
PCICM0 inner pressure command
ATTCL2 outer piston area inverse clutch gain
ATTCLU inner piston area inverse clutch gain
E4SC speed loop adjustment The limit imposed on the inner pressure command prevents the pressure setpoint from becoming negative.

SPEED LOOP

A block diagram of the speed loop section 65 is shown in FIG. 12. The speed loop section 65 includes an input portion which responds to the throttle position signal THRT to determine the filtered engine speed setpoint NESPCF which is applied to the feed forward torque determination section of FIG. 3. It also includes a speed loop controller portion which responds to the filtered engine speed setpoint NESPCF and to a measured engine speed signal NE to apply the speed loop adjustment signal E4SC to the torque apply strategy section 64 so as to perform a closed loop control of the turbine engine speed.

The filtered engine speed setpoint NESPCF is developed through a setpoint filter 88 from an engine speed setpoint NESPC developed by a schedule 89 and a cutoff frequency signal wsl is developed by a setpoint filter strategy operation 90 and is applied to the setpoint filter 88.

The operation of the speed setpoint schedule 89 is given by:

$$NESPC = f5(THRT)$$

where:
NESPC = engine speed setpoint
f5 = engine speed setpoint strategy

Figure 14:
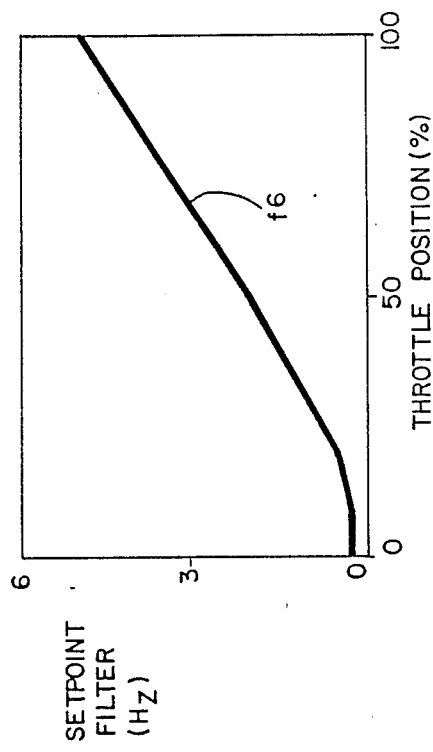
FIG. 14 is a graph illustrating a setpoint filter schedule as a function of throttle position.
Figure 13:
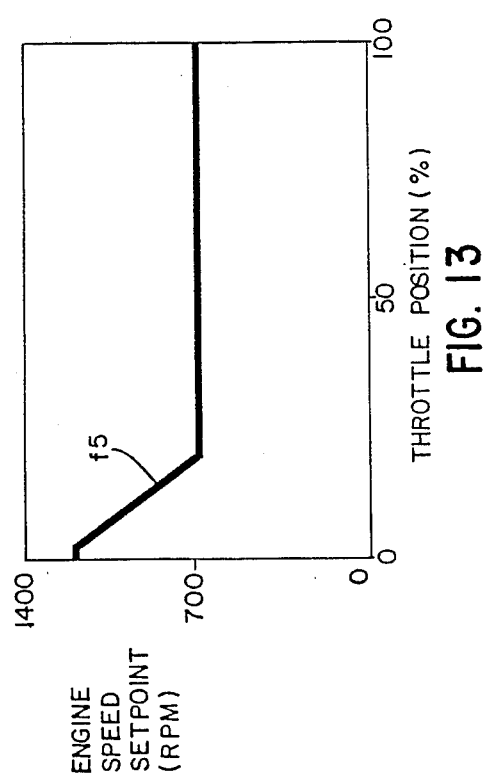
FIG. 13 is a graph illustrating an engine speed setpoint schedule as a function of throttle position.

A graph of this function is shown in FIG. 13. Note that until the throttle reaches a certain position, the engine speed setpoint decreases as a function of throttle position. Therefore, the larger the throttle, the more the control system will use the rotating inertia torque to accelerate the vehicle. Also as function of throttle position, the frequency for the engine speed setpoint is determined by the setpoint filter 88. This filter in the frequency domain is:

$$NESPCF = \frac{1}{s/wsl + 1} NESPC$$

where wsl is the cutoff frequency of the filter. A graph showing the relationship of the filter frequency to throttle is presented in FIG. 14. The discrete form of the filter is:

$$NESPCF(n) = XSFC(n)$$

$$XSFC(n+1) = -BSFC[NESPC(n) - XSFC(n)] + NESPC(n)$$

where:
wsl = f6(THRT)
BSFC = exp(−wsl * Tsf)
NESPCF = filtered engine speed setpoint
XSFC = filter state variable and where the initial condition is:

$$XSFC(0) = NEFIL \text{ (A filtered value of the actual engine speed)}$$

The filter 88 is a first order lag filter, like the filters 70 and 81, and is used for slowing down the rate of decrease of the engine speed setpoint. The major reason for using the filter 88 is to prevent a "torque surge" during rapid changes in throttle position. If the engine speed setpoint were not filtered, a step change in throttle position would result in a step change in the engine speed setpoint. This would cause a step change in the engine speed error signal correction to the inner piston pressure setpoint. For light throttle maneuvers, the clutch torque applied to the wheels would unexpectedly surge as throttle is increased in order to pull the engine speed down to the setpoint. For the light throttles, the setpoint is heavily filtered as to apply this torque gradually. This gives a good feel to the driver. However, for the larger throttles, the filtering on the setpoint is decreased. Again, the idea here is to take full advantage of the rotating inertia torque of the turbine engine in accelerating the vehicle. In the heavy throttle maneuvers, the driver will expect to feel a torque surge.

By initializing the filter 88 to a filtered version of the actual engine speed, the initial output of the filter is zero, therefore no appreciable contribution from the speed loop is subtracted from the feed forward. The effect of this is that torque is smoothly delivered from the clutch by the feed forward as soon as the driver demands it with throttle. If this filter were not initialized properly, again, the effect of a "torque surge" would exist from throttle application. This would be due to the speed loop suddenly increasing the clutch pressure setpoint until the desired engine speed was obtained.

The speed loop controller portion of the speed loop section includes a summing unit 91 which develops a signal E1SC proportional to the difference between the filtered engine speed setpoint signal NESPCF and the measured engine speed signal ME, a proportional gain block 92 which develops a signal E2SC proportional to the product of the E1SC signal and a gain parameter KASC, a lead/lag compensation block 93 which develops a signal E3SC from the signal E2SC and an integral-lead block 94 which develops the output compensation signal E4SC from the signal E3SC. The operations performed by the summing unit 91 and the proportional gain block 92 are expressed by the following formulas:

$$E1SC = NESPCF - NE$$

$$E2SC = KASC * E1SC$$

where:
KASC = speed loop proportional gain
E1SC = speed loop error
E2SC = speed loop error multiplied by proportional gain
NE = actual engine speed The lead/lag compensation block 93 is used to optimize the response of the speed loop. The lead/lag compensation in the frequency domain is of the form:

$$E3SC = \frac{s/wslead + 1}{s/wslag + 1} E2SC$$

where wslead is the lead frequency and wslag is the lag frequency for the speed loop compensation.

The discrete form is given by:

$$E3SC(n) = CSDC[E2SC(n) - XSDC(n)] + XSDC(n)$$

$$XSDC(n+1) = -BPSC[E2SC(n) - XSDC(n)-1] + E2SC(n)$$

where:
E3SC=output of lead/lag
Tss=sample period of speed loop
CSDC=wslag/wslead
BSDC=exp(−wslag * Tss)
XSDC=lead/lag state variable
and where the initial condition is:
XSDC(0)=0.

The integral-lead block 94 is used to drive the steady state error in the speed loop to zero, the lead developed in this compensation being used to improve the dynamic response of the loop. The integral-lead term of the controller, in the frequency domain is of the form:

$$E4SC = \frac{s/ws2led + 1}{s} E3SC$$

where ws2led is the lead frequency for this term. The integrator is limited to prevent saturation of its digital implementation.

The discrete form of this controller is given by:

$$E4SC(n) = X2SIC(n) + E3SC(n)$$

$$X2SIC(n+1) = X2SIC(n) + DSIC * E3SC(n)$$

$$X2SIC(n) = \begin{cases} X2LSIC, & X2SIC(n) < X2LSIC \\ X2SIC(n), & X2LSIC \leq X2SIC(n) \leq X2USIC \\ X2USIC, & X2SIC(n) > X2USIC \end{cases}$$

where:
E4SC(n)=speed loop adjustment
DSIC=ws2led * Tss
Tss=sample time of the speed loop
X2SIC=state variable of integrator/lead
X2LSIC=lower limit of integrator
X2USIC=upper limit of integrator
and where the initial condition is:
X2SIC(0)=0.0

The speed loop adjustment signal E4SC is then delivered to the torque apply strategy 64 of FIG. 8 as described above. The value for TLIM in the torque apply strategy is chosen so that the speed loop adjustment to the inner pressure command will not require a pressure setpoint higher than the supply or line pressure can deliver. In other words, TLIM is chosen to limit the inner feed forward torque pressure command. This enables the speed loop to have some headroom for controlling the engine speed.

INNER PISTON PRESSURE LOOP

FIG. 15 shows the inner piston pressure loop 66 which operates to provide a closed loop control. It includes an adder 96 which effects an algebraic summation to compare a clutch pressure setpoint signal PCISET with a feedback signal PCLU from the pressure sensor 59 and to develop an error signal E1PC. A controller section processes the error signal to develop an output signal in the form of an inner clutch duty cycle signal OPWCLU for control of the solenoid 57 which controls the pilot valve 53.

The value of the clutch pressure setpoint signal PCISET dependents upon conditions of operation. It is developed by a limiter block 98 to be the lesser of two control signals applied to the block 98, one being a signal PLSCHF which corresponds to an estimated value of line pressure, the inner clutch pressure being thereby limited to a value which is dependent upon estimated line pressure. Signal PLSCHF is developed by a pressure filter block 99 from a signal PLSCH which is an estimated steady state line pressure signal developed by a line pressure block 100 from the throttle signal THRT.

The second signal applied to the limiter block 98 is a clutch pressure set point command signal PCICM1 which is the sum of two signals applied to an adder 101, one signal being a clutch touch-off pressure signal PCE developed by a block 102 and the other being a signal applied from a logic switch 104. In a START position of switch 104, the inner clutch piston pressure command signal PCICM0 is applied to the adder 101 from the torque apply strategy section 64, shown in FIG. 8. In a DRIVE position of switch 104, a ramp signal is applied to the adder 101 from a ramp function block 106 which receives the estimated steady state line pressure signal PLSCH from the line pressure schedule block 100.

The controller section of the inner piston loop 66 comprises a multiplier 108 which develops an output signal E2PC equal to the product of the error signal E1PC from the adder 96 a proportional gain term KAPC developed by a pressure loop gain curve block 109 to which is applied the PLSCHF signal from the pressure filter block 99. A lead/lag block 110 develops a E3PC signal from the signal E2PC and an integral-lead block 111 develops a E4PC signal from the E3PC signal. An adder 112 effects an algebraic summation of the E4PC signal and a NPC signal from a null for valve block 114 to develop a E5PC signal which is converted to the output duty cycle control signal OPWCLU by duty cycle control block 116.

The function of the logic switch 104 is described in more detail in connection with FIG. 19. In brief, it may be switched to a HOLD position in response to movement of the shift lever 16 away from a neutral or park position. It may then be switched from the HOLD position to a START position as shown in FIG. 15 in response a throttle setting of greater than a certain value to apply the inner clutch piston pressure command PCICM0 from the torque apply strategy section 66 to the adder 101. The logic switch 104 may thereafter be switched from the START position to a DRIVE position under certain circumstances such as when the vehicle speed has been increased to a high value, being then operative to apply signal from the ramp function block 106 to the adder 101.

In the START position of switch 104, the adder 101 develops the inner clutch pressure set point command signal PCICM1 from a summation of the signal from the ramp function block 106 with the touch off pressure signal PCE from the filter 102, as set forth in the following equation:

$$PCICM1 = PCICM0 + PCE$$

where:
PCICM1=clutch pressure setpoint
PCE=touch off pressure

The touch off pressure PCE is developed by the filter 102 which operates as a first order filter on shifts of the transmission control lever 16 away from a park or neutral position and toward a drive position, to bring the pressure to a touch-off point, as required to hold the clutch in an engaged position while generating no more than enough torque to cause the vehicle to slowly creep if moved at all. The filter 102 slowly brings the pressure to the touch off point and holds it there for a good engagement feel to the driver. The operation of the touch off filter 102 in the frequency domain is:

$$PCE = \frac{1}{s/wto + 1} PCESET$$

where wto is the cutoff frequency of the filter. The discrete form of the touch off filter 102 is:

$$PCE(n) = XSTO(n)$$

$$XSTO(n+1) = -BSTO^*[PCESET - XSTO(n)] + PCESET$$

where:
BSTO=exp(−wto * Tsp)
Tsp=sample time of pressure loop
PCESET=touch off pressure setpoint
XSTO=filter state variable
and where the initial condition is:
XSTO(0)=0.0

The limiter block 98 develops the inner clutch pressure setpoint PCISET as a signal which is limited to the PCICM1 signal or to the estimated supply pressure value PLSCHF, whichever is smaller, operating as follows:

$$PCISET = \begin{cases} PCICM1 \text{ for } PCICM1 \leq PLSCHF \\ PLSCHF \text{ for } PCICM1 < PLSCHF \end{cases}$$

where:
PCISET=inner clutch pressure setpoint
PLSCHF=estimated value of line pressure The illustrated embodiment includes the block 100 for use when a transducer is not available to measure the actual line pressure and when line pressure is controlled open loop by the transmission as a function of throttle position. Thus block 100 may supply a filtered version of the line pressure setpoint to approximate the actual line pressure, and the signal PLSCH which corresponds to the estimated value for the line pressure is determined as a function of throttle position, as follows:

$$PLSCH = f7(THRT)$$

where:
PLSCH=estimated steady state line pressure
f7=line pressure schedule

Figure 16:
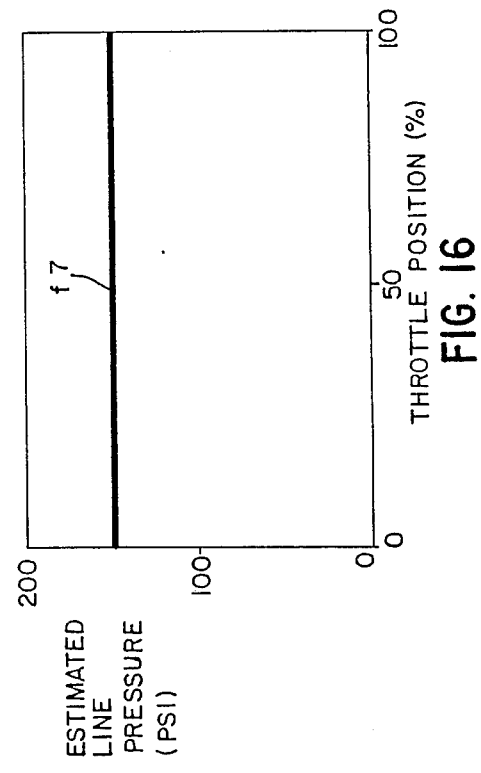
FIG. 16 is a graph illustrating a line pressure schedule as a function of throttle position.

FIG. 16 shows a line pressure schedule in which the pressure is at a constant 150 PSI. This was found to be desirable when using the controller in a vehicle in which the pressure from the transmission was not high enough for satisfactory operation under low throttle conditions and it was obtained by providing an additional ON-OFF solenoid valve in the transmission valve body to over-ride the normal transmission operation. It will be understood that when the pressure supplied by the transmission is satisfactory under low throttle conditions and is otherwise satisfactory, the line pressure schedule will not be a constant but will be a variable dependent upon the operating characteristics of the transmission.

To approximate the line pressure dynamics, the line pressure filter 99 operates on the estimated steady state line pressure signal PLSCH from block 100 and develops the estimated dynamic line pressure signal PLSCHF, which is shown in the frequency domain as:

$$PLSCHF = \frac{1}{s/wlp + 1} PLSCH$$

where wlp is the cutoff frequency of the filter. The discrete form of the filter is:
$$PLSCHF(n) = XSLP(n)$$

$$XSLP(n+1) = -BPSFLT^*[PLSCH(n) - XSLP(n)] + PLSCH(n)$$

where
BPSFLT=exp(−wlp * Tsf)
PLSCHF=touch off pressure setpoint
XSLP=filter state variable
and where the initial condition is:
XSLP(0)=150.0 (minimum value of line pressure)

The adder 96 develops the inner clutch pressure error signal, which is obtained by:

$$E1PC = PCISET - PCLU$$

where:
PCLU measured inner clutch pressure
E1PC inner clutch pressure error signal The error signal E1PC is then passed to multiplier 108 which effects control in response to the proportional gain term KAPC form the block 109. The proportional gain term KAPC is also determined as a function of the estimated line pressure to minimize variations in open loop gain while line pressure is varied through a full range of variations thereof.

Figure 17:
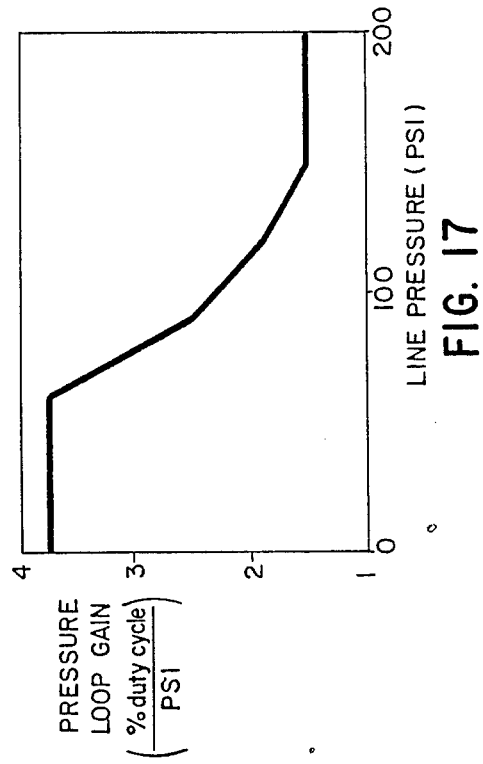
FIG. 17 is a graph illustrating a pressure loop gain schedule as a function of line pressure.

The gain function of the block 109 is presented in FIG. 17 and shows the inverse relationship of proportional gain to the estimated line pressure:

$$KAPC = f8(PLSCHF)$$

where:
f8=gain function
KAPC=pressure loop proportional gain

In the multiplier, the proportional gain term modifies the pressure loop error:

$$E2PC = KAPC^*E1PC$$

where:
E2PC=output from the proportional gain term

Lead/lag compensation is obtained by the block 110 which is operative to optimize the response of the inner clutch pressure loop.

The lead/lag compensation in the frequency domain is of the form:

$$E3PC = \frac{s/wplead + 1}{s/wplag + 1} E2PC$$

where wplead is the lead frequency and wplag is the lag frequency for the pressure loop compensation. The discrete form of the filter is:

$E3PC(n) = CPDC[E2PC(n) - X1PDC(n)] + X1PDC(n)$ $X1DC(n+1) = -BPDC[E2PC(n) - X1PDC(n)] + E2PDC(n)$ where:
E3PC = output of lead/lag
Tsp = sample period of pressure loop
CPDC = wplag/wplead
BPDC = exp(-wplag * Tsp)
X1PDC = lead/lag state variable
and where the initial condition is:
X1PDC(0) = 0.

The block 111 utilizes an integral-lead term to force the steady state error in the loop to be equal to zero. The lead used in this compensation also improves the dynamics response of the loop. In the frequency domain, the integral-lead term obtained by the block 111 is of the form:

$$E4PC = \frac{s/wilead + 1}{s} E3PC$$

where wilead is the lead frequency for this term. The integrator is limited so that saturation of its digital implementation will not saturate the input to the PWM generator. The discrete form of this controller is given by:

$E4PC(n) = X2PIC(n) + E3PC(n)$ $X2PIC(n+1) = X2PIC(n) + DPIC*E3PC(n)$ $$X2PIC(n) = \begin{cases} E4PC(n) = X2PIC(n) + E3PC(n) \\ X2PIC(n+1) = X2PIC(n) + DPIC*E3PC(n) \\ \{X2LPIC, X2PIC(n) < X2LPIC \\ X2PIC(n), X2LPIC \leq X2PIC(n) \leq X2UPIC \\ \{X2UPIC, X2PIC(n) < X2UPIC \end{cases}$$

where:
E4PC(n) = output of integral-lead term
DPIC = wilead * Tsp
X2PIC = state variable of integrator/lead
X2LPIC = lower limit of integrator
X2UPIC = upper limit of integrator
and where the initial condition is:
X2PIC(0) = 0.0

In the adder 112, the output of the integral-lead block 11 is then added to the null signal NPC, as follows:

$E5PC(n) = NPC + E4PC(n)$ where:
E5PC(n) = control signal used to determine duty cycle
NPC = null for valve In the block 114, the control signal E5PC is properly scaled to the correct units for developing the output signal OPWCLU, using a conversion term KPWM. The output signal OPWCLU is used for control of the duty cycle of drive signals applied to the solenoid 57 for control of the valve 53, to thereby control the valve 51 and the pressure applied to the inner piston portion 35. The operation is expressed mathematically as follows:

$OPWCLU = KPWM*E5PC$ where:
KPWM duty cycle conversion constant
OPWCLU = inner clutch duty cycle

OUTER PISTON PRESSURE LOOP

The outer piston pressure loop section 67 provides open loop control of the pressure applied to the large area outer piston portion 36 of the valve 11. A lead/lag block 116 responds to a signal applied from a logic switch 117 which is like the logic switch 104, the function of logic switches 104 and 117 being described in more detail in connection with the mode control schematic of FIG. 19. In a START position of switch 117, the outer clutch piston pressure command signal PCOCM0 is applied to the block 116 from the torque apply strategy section 64, shown in FIG. 8. In a DRIVE position of switch 117, a ramp signal is applied to the block 116 from a ramp function block 118 which receives the estimated steady state line pressure signal PLSCH from the line pressure schedule block 100 which is also shown in FIG. 15 and described hereinbefore.

Logic switch 117, like the switch 104, may be switched to a HOLD position in response to movement of the shift lever 16 away from a neutral or park position. It may then be switched from the HOLD position to a START position as shown in FIG. 18 in response a throttle setting of greater than a certain value to apply the inner clutch piston pressure command PCOCM0 from the torque apply strategy section 66 to the lead/lag block 116. The logic switch 117 may thereafter be switched from the START position to a DRIVE position under certain circumstances such as when the engine speed has been increased to a high value, being then operative to apply signal from the ramp function block 118 to the lead/lag block 116.

The lead/lag block 116 provides compensation which is such as to improve the open loop response of the outer piston pressure. The lead/lag compensation in the frequency domain is of the form:

$$PCOCM1 = \frac{s/wolead + 1}{s/wolag + 1} PCOCM0$$

where wolead is the lead frequency and wolag is the lag frequency. The discrete form of the filter is:

$PCOCM1(n) = CPCOCM*[PCOCM0(n) - PCOCM(n)] + XPCOCM(n)$ $XPCOCM(n+1) = -BPCOCM*[PCOCM0(n) - PCOCM(n)] + XPCOCM(n)$ where:
PCOCMI = augmented pressure command
CPCOCM = wplag/wplead
BPCOCM = exp(-wplag * Tsp)
XPCOCM = lead/lag state variable
and where the initial condition is:

XPCOCM(0)=0.0

The output signal from the lead/lag block 116 is the augmented pressure command signal PCOCM1 which is applied to a limiter block 120 which has a function similar to that of the limiter block 98 of the inner pressure loop section 66 of FIG. 15. The limiter block 120 develops an outer clutch pressure setpoint PCOSET as a signal which is limited to the PCOCMI signal or to the estimated dynamic supply pressure value PLSCHF developed by the pressure filter block 99, whichever is smaller. The block 99 in FIG. 18 is the same as the block 99 of FIG. 15, described hereinbefore. The operation is as follows:

$$PCOSET = \begin{cases} PCOCM1 \text{ for } PCOCM1 \leq PLSCHF \\ PLSCHF \text{ for } PCOCM1 > PLSCHF \end{cases}$$

where:
PCOSET=outer clutch pressure setpoint

The outer clutch pressure setpoint signal PCOSET is converted to a offset duty cycle gain term UC2V by a duty cycle gain term block 121 in which the signal is multiplied by a gain term KUC2 and by an adder 122 which adds an offset term UC20 from a block 124, the operation being expressed mathematically as follows:

$$UC2V = KUC2*PCOSET + UC20$$

where:
UC20=offset duty cycle term
KUC2=gain term
UC2V=duty cycle

The offset term UC20 is chosen to produce the maximum duty cycle applied to the outer piston solenoid valve which will yield no pressure. The gain term is chosen to best represent the static valve characteristics of duty cycle to outer piston pressure.

In a duty cycle conversion block 125, the duty cycle signal UC2V is properly scaled to the correct units for developing the output signal OPWCLL, using a gain term KPWM. The output signal OPWCLL is used for control of the duty cycle of drive signals applied to the solenoid 58 for control of the valve 54, to thereby control the valve 52 and the pressure applied to the outer piston portion 36, the operation being as follows:

$$OPWCLL = KPWM*UC2V$$

where:
KPWM=duty cycle conversion constant
OPWCLL=outer clutch duty cycle

MODE CONTROL

The mode control section 68 shown in FIG. 19 contains the main logic needed to properly run the controller. A description of the modes of operation follows.

OFF MODE—Clutch is destroked and a full off duty cycle is sent to the valve.
HOLD MODE—Inner clutch is controlled to the touch off pressure.
START MODE—The pressure setpoints for both clutches are obtained from the above described algorithm to control the turbine engine speed.
DRIVE MODE—Clutch is locked up. The pressure setpoints to both pressure loops are ramped up to the estimated value of line pressure.

The actions obtained from the mode control section 68 under various conditions are as follows:

| PATH | INPUT | ACTION |
|---|---|---|
| A: | Shift lever not in N or P | Initialize touch off pressure filter. Initialize both pressure loops. HOLD MODE pressure commands to both pressure loops. |
| B: | THRT > THRT1 (2%) | Initialize feed forward. Initialize torque apply strategy. Initialize speed loop Initialize TLAPSE counter. START MODE pressure commands to both pressure loops. |
| C: | THRT > (1%) -AND- NE > NETRI (3000 RPM) -OR- THRT > THRT2 (1%) -AND- TLAPSE = 0 -AND- NCO > NCOTRG (455 RPM) | Ramp up both pressure commands to line pressure. |
| D: | THRT < THRT2 (1%) -AND- NE < NETR2 (1000 RPM) | HOLD mode pressure both pressure loops. |
| E: | THRT < THRT2 (1%) -AND- NCO < NCOTRG (455 RPM) | HOLD mode pressure commands to both pressure loops. |
| F:} G:} H:} | Shift lever position in N or P | Full-off duty cycle to both clutch control solenoid valves |

In the illustrated system, there is no sensor available to measure the clutch input and clutch output speeds to determine lock up, and a timer "TLAPSE" is used to trigger the mode control from start mode to drive mode.

During start modes, the turbine engine's own speed control may interfere with the start clutch speed control. In order to prohibit this occurrence, a signal may be output from the start clutch controller to disable the turbine engine speed controller during start and drive modes, as indicated schematically by dotted line 130.

Flow charts for implementing the operations of the sections 63–68 under microprocessor control are shown in FIGS. 20 through 28. It will be understood that other electronic or other equivalent arrangements may be used.

Table 1 shows the logic for operating the line pressure boost solenoid and the turbine engine speed controller. Listings of controller parameter values and variables are also included and are shown in Tables 2 through 13. Tables 1 through 13 are as follows:

TABLE 1

CLUTCH CONTROLLER INTERFACE SIGNALS TO ENGINE AND TRANSMISSION CONTROLLERS

| MODE | SHIFT LEVER POSITION | LINE PRESSURE BOOST SOLENOID | TURBINE ENGINE SPEED CONTROL |
|---|---|---|---|
| OFF | NEUTRAL OR PARK | OFF | ENABLE |
| HOLD | DRIVE | ON | ENABLE |
|  | REVERSE | OFF | ENABLE |
| START | DRIVE | ON | DISABLE |
|  | REVERSE | OFF | DISABLE |
| DRIVE | DRIVE | OFF | DISABLE |
|  | REVERSE | OFF | DISABLE |

TABLE 2

FEED FORWARD TORQUE DETERMINATION CONTROL PARAMETERS

| PARAMETER NAME | PARAMETER DESCRIPTION | PARAMETER VALUE | PARAMETER UNITS |
|---|---|---|---|
| f1( ) | Gasifier speed (curve break points) | 0, 39 | %, % |
| | | 12, 59 | |
| | | 25, 75 | |
| | | 37, 83 | |
| | | 49, 91 | |
| | | 63, 97 | |
| | | 75, 100 | |
| | | 25, 100 | |
| wff | Gasifier tracking filter | 2.0 | rad/sec |
| XFFC (0) | Tracking filter I.C. | 39.0 | % |
| f2 ( ) | Torque intercept curve | 0, 28 | %, Ft-Lb |
| | (curve break points) | 40, 28 | |
| | | 50, 44 | |
| | | 60, 71 | |
| | | 80, 170 | |
| | | 90, 254 | |
| | | 95, 310 | |
| | | 100, 360 | |
| f3 ( ) | Torque slope curve (curve break points) | 0, 0.0220 | %, Ft Lb/RPM |
| | | 40, 0.0220 | |
| | | 50, 0.0260 | |
| | | 60, 0.0310 | |
| | | 80, 0.0450 | |
| | | 90, 0.0548 | |
| | | 95, 0.0592 | |
| KTRQ | Torque scaling factor | 1.0 | Ft-Lb/Ft/lb |

TABLE 3

FEED FORWARD TORQUE DETERMINATION CONTROL VARIABLES

| VARIABLE NAME | VARIABLE DESCRIPTION | VARIABLE UNITS |
|---|---|---|
| THRT | Throttle position | % |
| NG | Percent steady state gasifier speed | % |
| NGF | Estimated (filtered) gasifier speed | % |
| TEO | Torque intercept | Ft-Lb |
| KTE | Torque slope | Ft-Lb/RPM |
| TE | Estimated engine torque | Ft-Lb |
| NESPCF | Filtered engine speed setpoint (from speed loop) | RPM |

TABLE 4

TORQUE APPLY STRATEGY CONTROL PARAMETERS

| PARAMETER NAME | PARAMETER DESCRIPTION | PARAMETER VALUE | PARAMETER UNITS |
|---|---|---|---|
| TLIM | Maximum feed forward torque that can be applied to the inner piston | 80.0 | Ft-Lb |
| f4( ) | Outer piston pressure response curve (curve break points) | 0, 7.3 | PSI, rad/sec |
| | | 25, 7.3 | |
| | | 75, 20.0 | |
| | | 100, 44.0 | |
| | | 120, 110.0 | |
| | | 150, 110.0 | |
| XPOCCV(0) | Outer piston response filter I.C. | 0.0 | Ft-Lb |
| ATTCL2 | Inverse outer clutch gain | 0.4 | PSI/Ft-Lb |
| ATTCLU | Inverse inner clutch gain | 1.0 | PSI/Ft-Lb |

TABLE 4-continued
TORQUE APPLY STRATEGY CONTROL PARAMETERS

| PARAMETER NAME | PARAMETER DESCRIPTION | PARAMETER VALUE | PARAMETER UNITS |
|---|---|---|---|
| | gain | | |

TABLE 5

TORQUE APPLY STRATEGY CONTROL VARIABLES

| VARIABLE NAME | VARIABLE DESCRIPTION | VARIABLE UNITS |
|---|---|---|
| TE | Estimated engine torque (from feed forward determination) | Ft-Lb |
| TOUT | Outer piston area torque command | Ft-Lb |
| wpf | Outer piston response tracking filter coefficient | rad/sec |
| TOUTF | Approximate outer piston area torque | Ft-Lb |
| TIN | Inner piston area torque command | Ft-Lb |
| E4SC | Speed loop adjustment (from speed loop) | Ft-Lb |
| PCOCM0 | Outer clutch piston pressure command | PSI |
| PCICM0 | Inner clutch piston pressure command | PSI |

TABLE 6

SPEED LOOP CONTROL PARAMETERS

| PARAMETER NAME | PARAMETER DESCRIPTION | PARAMETER VALUE | PARAMETER UNITS |
|---|---|---|---|
| f(5) | Engine speed setpoint (curve break points) | 0, 1200 | %, RPM |
| | | 3, 1200 | |
| | | 0, 700 | |
| | | 100, 700 | |
| f6( ) | Setpoint filter curve (curve break points) | 0, 1.57 | %, rad/sec |
| | | 8, 1.57 | |
| | | 20, 3.14 | |
| | | 50, 12.57 | |
| | | 100, 31.42 | |
| KASC | Speed loop proportional gain | 0.1 | Ft-Lb/RPM |
| wslead | Speed loop lead frequency of lead/lag compensation | 1.0 | rad/sec |
| wslag | Speed loop lag frequency of lead/lag compensation (Note: wslead - wslag, therefore, the lead/lag is not used.) | 1.0 | rad/sec |
| XSDC(0) | Lead/lag I.C. | 0.0 | Ft-Lb |
| ws2led | Speed loop lead frequency of integ/lead compensation (Note: ws2led = 0.0, therefore, the integrator/lead is not used.) | 0.0 | rad/sec |
| X2SIC | Integ/lead I.C. | 0.0 | Ft-Lb |
| X2LSIC | Lower limit of speed loop integrator | 0.0 | Ft-Lb |
| X2USIC | Upper limit of speed loop integrator | 0.0 | Ft-Lb |

TABLE 7

SPEED LOOP CONTROL VARIABLES

| VARIABLE NAME | VARIABLE DESCRIPTION | VARIABLE UNITS |
|---|---|---|
| THRD | Throttle position | % |
| NESPC | Engine speed setpoint | RPM |

TABLE 7-continued

SPEED LOOP CONTROL VARIABLES

| VARIABLE NAME | VARIABLE DESCRIPTION | VARIABLE UNITS |
|---|---|---|
| ws1 | Setpoint filter frequency | rad/sec |
| XSFC(0) | Setpoint filter I.C. (equal to measured engine speed) | RPM |
| NESPCF | Filtered engine speed setpoint | RPM |
| NE | Measured engine speed | RPM |
| E1SC | First error signal | RPM |
| E2SC | Second error signal (proportional output) | Ft-Lb |
| E3SC | Third error signal (lead/lag output) | Ft-Lb |
| E4SC | Fourth error signal (integ/lead output) | Ft-Lb |

TABLE 8

INNER PRESSURE LOOP CONTROL PARAMETERS

| PARAMETER NAME | PARAMETER DESCRIPTION | PARAMETER VALUE | PARAMETER UNITS |
|---|---|---|---|
| f7( ) | Line pressure schedule (curve break points) | 0, 150<br>100, 150 | %, PSI |
| wlp | Pressure filter frequency | 6.28 | rad/sec |
| XSLP(0) | Pressure filter I.C. | 150.0 | PSI |
| wto | Touch off filter frequency | 0.785 | rad/sec |
| XSTO(0) | Touch off filter I.C. | 0.0 | PSI |
| PCESET | Touch off pressure setpoint | 27.0 | PSI |
| f8( ) | Inner pressure loop Proportional gain (curve break points) | 0, 3.75<br>60, 3.75<br>90, 2.50<br>120, 1.88<br>150, 1.50<br>200, 1.50 | PSI, % PSI |
| wplead | Inner pressure loop lead of lead/lag compensation | 102.0 | rad/sec |
| wplag | Inner pressure loop lag of lead/lag compensation | 314.0 | rad/sec |
| X1PDC(0) | Lead/lag I.C. | 0.0 | % |
| wilead | Inner pressure loop lead of integ/lead compensation | 138.0 | rad/sec |
| X2PIC(0) | Integ/lead I.C. | 0.0 | % |
| X2LPIC | Lower limit of inner pressure loop integrator | −30.0 | % |
| X2UPIC | Upper limit of inner pressure loop integrator | 30.0 | % |
| NPC | Valve null | 50.0 | % |
| KPWM | Duty cycle conversion | 122.88 | counts/% |

TABLE 9

INNER PRESSURE LOOP CONTROL VARIABLES

| VARIABLE NAME | VARIABLE DESCRIPTION | VARIABLE UNITS |
|---|---|---|
| THRT | Throttle position | % |
| PCICMO | Inner piston pressure command | PSI |
| PCE | Touch off pressure | PSI |
| PCICM1 | Inner piston pressure command | PSI |
| PCISET | Inner piston pressure setpoint | PSI |
| PLSCH | Steady state estimation of line pressure | PSI |
| PLSCHF | Estimated line pressure | PSI |
| PCLU | Measured inner clutch pressure | PSI |
| KAPC | Inner pressure loop gain | %/PSI |
| E1PC | First error signal | PSI |
| E2PC | Second error signal (proportional output) | % |
| E3PC | Third error signal (lead/lag output) | % |
| E4PC | Fourth error signal (integ/lead output) | % |
| E5PC | Fifth error signal (after null is added) | % |
| OPPCLU | Inner solenoid duty cycle | COUNTS |

TABLE 10

OUTER PRESSURE LOOP CONTROL PARAMETERS

| PARAMETER NAME | PARAMETER DESCRIPTION | PARAMETER VALUE | PARAMETER UNITS |
|---|---|---|---|
| wolead | Outer pressure loop lead of lead/lag compensation | 1.0 | rad/sec |
| wolag | Outer pressure loop lag of lead/lag compensation (Note: wolag = wolead, therefore the lead/lag is not used.) | 1.0 | rad/sec |
| XPCOCM(0) | Lead/lag I.C. | 0.0 | PSI |
| KUC2 | Duty cycle gain term | 0.47 | %/PSI |
| UC20 | Duty cycle offset | 40.0 | % |
| KPWM | Duty cycle conversion | 122.88 | counts/% |

TABLE 11

OUTER PRESSURE LOOP CONTROL VARIABLES

| VARIABLE NAME | VARIABLE DESCRIPTION | VARIABLE UNITS |
|---|---|---|
| THRT | Throttle position | % |
| PCOCM0 | Outer piston pressure command | PSI |
| PCOCM1 | Outer piston pressure command | PSI |
| PCOSET | Outer piston pressure setpoint | PSI |
| PLSCH | Steady state estimation of line pressure | PSI |
| PLSCHF | Estimated line pressure | PSI |
| OPWCLL | Outer solenoid duty cycle | COUNTS |

TABLE 12

MISCELLANEOUS CONTROL PARAMETERS

| PARAMETER NAME | PARAMETER DESCRIPTION | PARAMETER VALUE | PARAMETER UNITS |
|---|---|---|---|
| DELPIN | Inner pressure ramp slope | 50.0 | PSI/sec |
| DELPOT | Outer pressure ramp slope | 50.0 | PSI/sec |
| THRT1 | Throttle trigger | 2.0 | % |
| THRT2 | Throttle trigger | 1.0 | % |
| NETR1 | Engine speed trigger | 3000.0 | RPM |
| NETR2 | Engine speed trigger | 1000.0 | RPM |
| NCOTRG | Transmission speed trigger | 455.0 | RPM |

TABLE 13

MISCELLANEOUS CONTROL VARIABLES

| VARIABLE NAME | VARIABLE DESCRIPTION | VARIABLE UNITS |
|---|---|---|
| THRT | Throttle position | % |
| NE | Engine speed | RPM |
| NCO | Transmission output speed | RPM |
| SHFT | Shift lever position | PRND321 |
| PCOCMO | Outer piston pressure command | PSI |
| PCICMO | Inner piston pressure command | PSI |
| PLSCH | Steady state estimation of line pressure | PSI |

TABLE 13-continued

| | MISCELLANEOUS CONTROL VARIABLES | |
|---|---|---|
| VARIABLE NAME | VARIABLE DESCRIPTION | VARIABLE UNITS |
| XRMPIN(0) | Inner pressure ramp I.C. | PSI |
| XRMPOT(0) | Outer pressure ramp I.C. | PSI |

In the operation of the system, the logic switches 104 and 117 are operated to a hold position in response to movement of the transmission control or shift lever 16 out of a non-drive position, e.g. a neutral or park position, and to a drive position. The touch off pressure filter 102 and the pressure loops are initialized while HOLD MODE commands are sent to both pressure loops, pressure being slowly applied under control of the filter 102 until the touch off point is reached. When light pressure is then applied to the throttle 15, the system then functions to apply clutch pressure gradually, yielding a smooth and slow acceleration and giving a good feel to the driver. However, for heavier throttles the system applies clutch pressure more rapidly, in proportion to the throttle. When a heavy throttle is applied the acceleration is quite rapid as a result of the use of the rotating inertia torque to obtain acceleration. An effect nearly equivalent to "popping" the clutch in a conventional vehicle with a manual transmission is obtained. At all intermediate throttle settings, the driver is provided with a highly desirable feel of the operation of the clutch.

When using the system in conjunction with a gas turbine engine, the elapsed time between throttle application and vehicle acceleration may be reduced from a time of on the order of 2 seconds or more to a small fraction of a second, e.g. less than 0.25 seconds.

The illustrated system has many advantages including the fact that it is readily adaptable for use with engines, transmissions and other components having various characteristics and it is readily adaptable for use with engine and transmission controls of various types and characteristics.

The system is also advantageous in that it can be modified is accordance with the types of available sensors and controls. One advantage of the system as disclosed is that the gasifier speed is estimated from the throttle operation so that it is not necessary to sense the gasifier speed. However, with a gasifier speed sensor, this feature is not necessary, and greater accuracy may be obtained. The illustrated system also uses a timer to determine clutch lockup. An alternative is to provide a clutch output speed sensor which would be advantageous in that it would allow a slip speed control to smooth out transmission shifts and otherwise improve operation. Also, although the system can be operated with relatively low line pressures, it can be readily modified to take advantage of higher line pressures when available. Temperature compensation, automatic or manual control of touch off pressure and creep and such other features as may be desired can be readily incorporated in the system.

It will be understood that other modifications and variations may be effected without departing from the spirit and scope of the novel concepts of this invention.

We claim:

1. A control system for use in a vehicle drive train which includes an engine having a throttle associated therewith, a transmission having a control associated therewith, a clutch unit for transmitting torque from said engine to said transmission, engine speed sensing means for developing an engine speed signal, and clutch control means for controlling the torque transmitted by said clutch unit as a function of at least one torque control signal applied thereto, said control system comprising: throttle position sensing means for developing a throttle signal corresponding to the position of said throttle, and controller means responsive to said throttle signal for applying said torque control signal to said clutch control means, said controller means including engine speed set point means for developing a speed set point signal and adjustment means for developing a torque adjustment signal in response to a comparison of the speed set point signal and the engine speed signal, said controller being responsive to advancing movement of said throttle toward a more open position to effect control of said clutch unit to utilize rotating inertia torque of said engine for more rapid vehicle acceleration.

2. A control system as defined in claim 1 wherein the output torque of said engine has a certain characteristic relationship to changes in position of said throttle, said controller means comprising estimated torque signal means responsive to said throttle signal for developing an estimated torque signal as a function of said characteristic relationship.

3. A control system as defined in claim 6, wherein said engine speed set point means includes set point schedule means for developing set point schedule signal corresponding to a characteristic relationship of engine speed to throttle position.

4. A control system as defined in claim 3 for a gas turbine engine or the like, said set point schedule signal being reduced in response to an increase in throttle position away from a minimum throttle position.

5. A control system as defined in claim 3, wherein said engine speed set point means further includes set point filter means responsive to said set point schedule signal to develop said speed set point signal.

6. A control system as defined in claim 5, wherein said engine speed set point means further includes means for modifying the response characteristics of said set point filter means as a function of said throttle signal.

7. A control system as defined in claim 6, wherein a cut-off frequency of said set point filter is increased in response to an increase in said throttle signal.

8. A control system for use in a vehicle drive train which includes an engine having a throttle associated therewith, a transmission having a control associated therewith, a clutch unit for transmitting torque from said engine to said transmission, the output torque of said engine having a a certain characteristic relationship to changes in position of said throttle, and clutch control means for controlling the torque transmitted by said clutch unit as a function of at least one torque control signal applied thereto, said control system comprising: throttle position sensing means for developing a throttle signal corresponding to the position of said throttle, and controller means including estimated torque signal means responsive to said throttle signal for developing an estimated torque signal as a function of said characteristic relationship responsive to said throttle signal for applying said torque control signal to said clutch control means, said controller means being responsive to advancing movement of said throttle toward a more open position to effect control of said clutch unit to utilize rotating inertia torque of said engine for more rapid vehicle acceleration wherein said controller means comprises engine speed setpoint means for developing a speed set point signal as a function of said throttle signal, said estimated torque signal means being responsive to said speed set point signal.

9. A control system for use in a vehicle drive train which includes an engine having a throttle associated therewith and having an output torque which has a certain characteristic relationship to changes in position of said throttle, a transmission having a control associated therewith, a clutch unit for transmitting torque from said engine to said transmission, engine speed sensing means for developing an engine speed signal, and clutch control means for controlling the torque transmitted by said clutch unit as a function of at least one torque control signal applied thereto, said control system comprising: throttle position sensing means for developing a throttle signal corresponding to the position of said throttle, and controller means including engine speed setpoint means for developing a speed set point signal as a function of said throttle signal, and adjustment means for developing a torque adjustment signal in response to a comparison of said speed set point signal and said engine speed signal responsive to said throttle signal for applying said torque control signal to clutch control means, said controller means comprising estimated torque signal means responsive to said throttle signal for developing an estimated torque signal as a function of said characteristic relationship, means responsive to said estimated torque signal for developing said torque control signal, and means for modifying said torque control signal as a function of said throttle signal and said engine signal.

10. A control system for use in a vehicle drive train which includes an engine having a throttle associated therewith and having an output torque which has a certain characteristic relationship to changes in position of said throttle, a transmission having a control associated therewith, a clutch unit for transmitting torque from said engine to said transmission, engine speed sensing means for developing an engine speed signal, and clutch control means for controlling the torque transmitted by said clutch unit as a function of at least one torque control signal applied thereto, said control system comprising: throttle position sensing means for developing a throttle signal corresponding to the position of said throttle, and controller means responsive to said throttle signal for applying said torque control signal to clutch control means, said controller means comprising engine speed setpoint means for developing a speed set point signal as a function of said throttle signal, estimated torque signal means responsive to said throttle signal for developing an estimated torque signal as a function of said characteristic relationship, said estimated torque signal means being responsive to said speed set point signal, means responsive to said estimated torque signal for developing said torque control signal, and means for modifying said torque control signal as a function of said throttle signal and said engine signal.

11. A control system as defined in claim 10, wherein said engine speed set point means includes set point schedule means for developing set point schedule signal corresponding to a characteristic relationship of engine speed to throttle position.

12. A control system as defined in claim 11 for a gas turbine engine or the like, said set point schedule signal being reduced in response to an increase in throttle position away from a minimum throttle position.

13. A control system as defined in claim 11, wherein said engine speed set point means further includes set point filter means responsive to said set point schedule signal to develop said speed set point signal.

14. A control system as defined in claim 13, wherein said engine speed set point means further includes means for modifying the response characteristics of said set point filter means as a function of said throttle signal.

15. A control system as defined in claim 14, wherein a cut-off frequency of said set point filter is increased in response to an increase in said throttle signal.

16. A control system for use in a vehicle drive train which includes an engine having a throttle associated therewith, a transmission having a control associated therewith, a dual area clutch unit for transmitting torque from said engine to said transmission in response to first and second separately applied fluid pressures, and clutch control means for controlling the torque transmitted by said clutch unit as a function of a first torque control signal operative to control said first fluid pressure and a second torque control signal operative to control said second fluid pressure, said control system comprising controller means including estimated torque signal means for developing an estimated torque signal, torque apply strategy means responsive to said estimated torque signal for developing first and second pressure command signals, first pressure loop means responsive to said first pressure command signal to develop said first torque control signal, and second pressure loop means responsive to said second pressure command signal to develop said second torque control signal.

17. A control system as defined in claim 16, including pressure sensing means for developing a pressure signal proportional to said first fluid pressure, said first pressure loop means being responsive to said pressure signal and being operative in a closed loop control mode.

18. A control system as defined in claim 17, wherein said second pressure loop means being operative in an open loop control mode.

19. A control system as defined in claim 18, wherein said torque apply strategy means includes controllable filter means operative in a manner such as obviate rapid changes in said second pressure command signal while obtaining relatively rapid changes in said first pressure while obtaining relatively rapid changes in said first pressure command signal when required to obtain transmission of torque commensurate with said estimated torque signal.

20. A control system for use in a vehicle drive train which includes an engine having a throttle associated therewith, a transmission having a control associated therewith which is movable from a non-drive position to a drive position, a clutch unit for transmitting torque from said engine to said transmission, engine speed sensing means for developing an engine speed signal, and clutch control means for controlling the torque transmitted by said clutch unit as a function of at least one torque control signal applied thereto, said control system comprising: throttle position sensing means for developing a throttle signal corresponding to the position of said throttle, and controller means including engine speed set point means for developing a speed set point signal, adjustment means for developing a torque adjustment signal in response to a comparison of the speed set point signal and the engine speed signal, and touch off pressure control means responsive to movement of said transmission control from a non-drive position to a drive position to gradually apply a torque control signal to said clutch control means and to develop a small torque no more than that required to produce a slow creep of the vehicle, said control means including means responsive to said throttle signal for applying a torque control signal to said clutch control means to override said touch off pressure control means and effect driving movement of said vehicle.

* * * * *